United States Patent
Miyazaki et al.

(10) Patent No.: US 8,450,893 B2
(45) Date of Patent: May 28, 2013

(54) MOTOR STRUCTURE WITH PLANAR COIL TYPE ROTATION DETECTOR

(75) Inventors: Hiroaki Miyazaki, Ichinomiya (JP);
Takehide Nakamura, Handa (JP);
Tomoaki Inoue, Nagoya (JP); Takahiro Nakamura, Anjo (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 595 days.

(21) Appl. No.: 12/588,998

(22) Filed: Nov. 4, 2009

(65) Prior Publication Data

US 2010/0109491 A1    May 6, 2010

(30) Foreign Application Priority Data

Nov. 6, 2008 (JP) ................................. 2008-285848
Apr. 16, 2009 (JP) ................................. 2009-100231
Apr. 28, 2009 (JP) ................................. 2009-109877

(51) Int. Cl.
*H02K 11/00* (2006.01)
*H02K 17/44* (2006.01)
*H02K 17/42* (2006.01)
*G01B 7/30* (2006.01)

(52) U.S. Cl.
USPC ...... 310/68 B; 310/112; 310/168; 324/207.25

(58) Field of Classification Search
USPC .......... 310/68 B, DIG. 6, 112, 168; 336/120; 324/207.25
See application file for complete search history.

(56) References Cited

U.S. PATENT DOCUMENTS

| | | | | |
|---|---|---|---|---|
| 4,223,300 | A | * | 9/1980 | Wiklund ................... 340/870.31 |
| 4,725,478 | A | * | 2/1988 | Mathias et al. ................ 428/207 |
| 5,239,288 | A | * | 8/1993 | Tsals .............................. 336/120 |
| 5,406,155 | A | * | 4/1995 | Persson ......................... 310/68 B |
| 5,678,646 | A | * | 10/1997 | Fliege ........................... 180/65.1 |
| 6,304,014 | B1 | * | 10/2001 | England et al. ............. 310/68 B |
| 7,268,451 | B2 | * | 9/2007 | Hertz et al. ................. 310/68 B |

(Continued)

FOREIGN PATENT DOCUMENTS

| DE | 60 2004 007 807 T2 | 4/2008 |
|---|---|---|
| EP | 0 585 725 B1 | 3/1993 |

(Continued)

OTHER PUBLICATIONS

Aug. 18, 2011 Office Action issued in German Patent Application No. 10 2009 052 014.7 (with English language translation).

(Continued)

*Primary Examiner* — Tran Nguyen
*Assistant Examiner* — Jose Gonzalez Quinones
(74) *Attorney, Agent, or Firm* — Oliff & Berridge, PLC

(57) ABSTRACT

A casing of a motor with resolver includes a stator, a motor shaft rotatably supported by a bearing, a motor rotor integrally rotatable with the motor shaft, and a resolver for detecting a rotation angle of the motor rotor. The resolver includes a disc-shaped resolver stator held on the motor casing and having a surface on which a thin-film-shaped coil is formed, and a disc-shaped resolver rotor provided on an end face of the motor rotor and having a surface on which a thin-film-shaped coil is formed. Part of the motor casing holding the outer periphery of the resolver stator is formed as a shield portion cylindrically protruding along the outer periphery of the resolver rotor to the rotor. The motor casing and the shield portion are each made of a non-magnetic conductive material.

14 Claims, 29 Drawing Sheets

U.S. PATENT DOCUMENTS

| | | | |
|---|---|---|---|
| 2006/0125588 A1* | 6/2006 | Miya | 336/120 |
| 2006/0226719 A1 | 10/2006 | Nakanishi et al. | |
| 2010/0109491 A1* | 5/2010 | Miyazaki et al. | 310/68 B |
| 2010/0117632 A1* | 5/2010 | Miyazaki et al. | 324/207.25 |
| 2010/0244816 A1* | 9/2010 | Nakamura | 324/207.25 |
| 2010/0315075 A1* | 12/2010 | Kamiya et al. | 324/207.25 |
| 2011/0109304 A1* | 5/2011 | Suzuki et al. | 324/207.25 |

FOREIGN PATENT DOCUMENTS

| | | |
|---|---|---|
| EP | 1 656 636 B1 | 7/2007 |
| JP | U-1-171563 | 12/1989 |
| JP | A-8-292066 | 11/1996 |
| JP | A-9-65617 | 3/1997 |
| JP | A-2000-292205 | 10/2000 |
| JP | A-2003-139569 | 5/2003 |
| JP | A-2006-158014 | 6/2006 |
| JP | A-2007-124757 | 5/2007 |
| JP | 2008160909 * | 7/2008 |
| JP | A-2008-197046 | 8/2008 |
| JP | A-2008-215835 | 9/2008 |
| JP | 2008259355 * | 10/2008 |
| JP | A-2008-256486 | 10/2008 |

OTHER PUBLICATIONS

Office Action issued in Chinese Patent Application No. 200910211417.1 dated Jul. 18, 2011 (with translation).

Mar. 5, 2013 Office Action issued in Japanese Patent Application No. 2009-109877 (with translation).

* cited by examiner

FIG. 27A
FIG. 27B
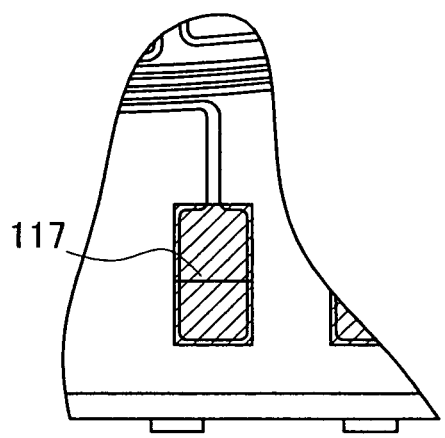
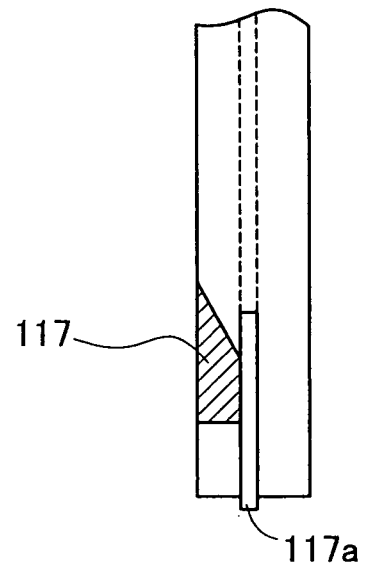

MOTOR STRUCTURE WITH PLANAR COIL TYPE ROTATION DETECTOR

CROSS-REFERENCE TO RELATED APPLICATIONS

This application is based upon and claims the benefit of priority from each of the prior Japanese Patent Applications No. 2008-285848 filed on Nov. 6, 2008, No. 2009-100231 filed on Apr. 16, 2009, and No. 2009-109877 filed on Apr. 28, 2009, the entire contents of which are incorporated herein by reference.

TECHNICAL FIELD

The present invention relates to a motor structure with rotation detector, including a motor casing, a motor stator and a bearing provided in the motor casing, a rotating shaft rotatably supported in the motor casing by the bearing, a motor rotor rotatable with the rotating shaft, and a rotation detector for detecting a rotation angle of the motor rotor.

BACKGROUND ART

Heretofore, a hybrid electric vehicle and an electric vehicle use a high-power brushless motor. To control the brushless motor of the hybrid electric vehicle, it is necessary to accurately ascertain the rotation position (angle) of a motor rotating shaft. This is because, for switching control of energization to each coil of the motor stator, the rotation position of a motor rotor has to be accurately ascertained. In vehicles, specifically, drivability is apt to deteriorate due to motor cogging. Reducing the cogging is therefore desired. Accordingly, there is a large demand for accurate switching of coil energization.

Herein, for detection of the position of the rotating shaft of each motor mounted in the hybrid electric vehicle and the electric vehicle, a resolver is used to satisfy such functions as high-temperature resistance, noise resistance, vibration resistance, and high-humid resistance. The resolver is built in the motor and directly mounted to the motor rotating shaft.

FIG. 33 is a cross sectional view of a motor 200 with rotation detector disclosed in JP 2007-124757A. A motor stator 202 is fixed on the inner periphery of a motor casing 208. A bus bar 201 is connected to one end of the motor stator 202. A resolver stator 203 is fixed to the inner peripheral end face of the bus bar 201. The resolver stator 203 includes a resolver stator coil 204 in a wound form.

On the other hand, a pair of bearings 209 are fixed in the motor casing 208 and rotatably support a rotating shaft 205 of the motor rotor 206. On the rotating shaft 205, a resolver rotor 207 is fixedly mounted so as to face the resolver stator 203. The resolver stator 203 and the resolver rotor 207 constitute a resolver serving as a rotation detector.

JP 9(1997)-65617A also discloses a similar invention to JP 2007-124757A. A difference between the '617 invention and the '757 invention is that the resolver stator 203 of the '757 invention is attached to the bus bar 201 while the resolver stator of the '617 invention is fixed to a casing.

On the other hand, JP 2000-292205A discloses an invention using an exciting signal modulated onto a high frequency carrier, thereby reducing the number of turns of a coil in the resolver stator to achieve cost reduction. This invention enables a reduction in the number of turns of a coil and thus can use a sheet coil without using a winding coil. The resolver therefore can be made compact.

SUMMARY OF INVENTION

Technical Problem

However, the conventional motor with rotation detector has the following structural problems. To be concrete, in the motor with rotation detector in JP 2007-124757A and JP 9-65617A, when the resolver rotor 207 is placed to face the resolver stator 203 on which the resolver stator coil 204 is wound as shown in FIG. 33, the length of the rotating shaft 205 in the axial direction is long because the rotor 207 and the stator 203 have almost the same width. Consequently, there is a problem that the entire motor is made large in the axial direction of the rotating shaft.

Furthermore, the magnetic field generated in the motor stator 202 acts as noise affecting the resolver stator 203 and the resolver rotor 207. This may cause lowering of the angle detection accuracy of the rotation detector.

The rotation detector is excited in a frequency region of 8 kHz to 10 kHz. Therefore, the rotation detector is likely to be influenced by disturbed electromagnetic noise from the motor (noise of a frequency of 7.2 kHz for a sixth-order motor (18000 rpm, four pairs of N-S poles)). Furthermore, the rotation detector has an iron core (a back core) and thus the magnetic field generated in the motor stator 202 gives a great noise to the resolver stator coil 204. This may lower the angle detection accuracy of the rotation detector.

In the inventions of JP 2007-124757A and JP 9-65617A, the rotation detector (the resolver) has to be placed in a position apart from the motor stator to reduce the influence of noise, making the length of the motor longer in the axial direction.

Moreover, the motor with rotation detector in JP2000-292205A can realize cost reduction by the reduced number of coil turns. However, this rotation detector has the back core and therefore the magnetic field generated in the motor stator easily passes the inside of the back core. This gives noise to the sheet coil of the resolver stator, thus lowering the angle detection accuracy of the rotation detector.

If the iron core is magnetically saturated when the rotation detector is subjected to the disturbed magnetic field having a high magnetic flux density, the rotation detector could not completely operate.

The present invention has been made to solve the above problems and has a purpose to provide a motor with rotation detector having a shorter length of a motor rotating shaft in an axial direction than conventional. Another purpose of the invention is to provide a motor with rotation detector capable of providing improved angle detection accuracy of the rotation detector.

Solution to Problem

To achieve the above purpose, the invention provides a motor structure with rotation detector comprising: a motor casing; a motor stator provided in the motor casing; a bearing provided in the motor casing; a rotating shaft rotatably supported in the motor casing by the bearing; a motor rotor provided to be integrally rotatable with the rotating shaft; and a rotation detector for detecting a rotation angle of the motor rotor, wherein the rotation detector includes: a disc-shaped resolver stator held in the motor casing and having a surface on which a thin-film-shaped coil is formed; and a disc-shaped resolver rotor provided on an end face of the motor rotor and having a surface on which a thin-film-shaped coil is formed.

According to another aspect of the invention, a motor structure with rotation detector comprising: a motor casing; a motor stator provided in the motor casing; a bearing provided in the motor casing; a rotating shaft rotatably supported in the motor casing by the bearing; a motor rotor provided to be integrally rotatable with the rotating shaft; and a rotation detector for detecting a rotation angle of the motor rotor, wherein the rotation detector includes: a resolver stator attached to the motor casing; and a resolver rotor attached to the motor rotor, the resolver rotor is constituted of an air core coil and provided on an end face of the motor rotor, and the resolver stator is constituted of an air core coil.

BRIEF DESCRIPTION OF DRAWINGS

FIG. 27A is an enlarged view of a section B in FIG. 17 in the eighth embodiment;

FIG. 27B is a cross sectional view of the section B in FIG. 17 in the eighth embodiment;

DESCRIPTION OF EMBODIMENTS

<First Embodiment>

A detailed description of a first preferred embodiment of a motor structure with rotation detector embodying the present invention will now be given referring to the accompanying drawings.

Figure 1:
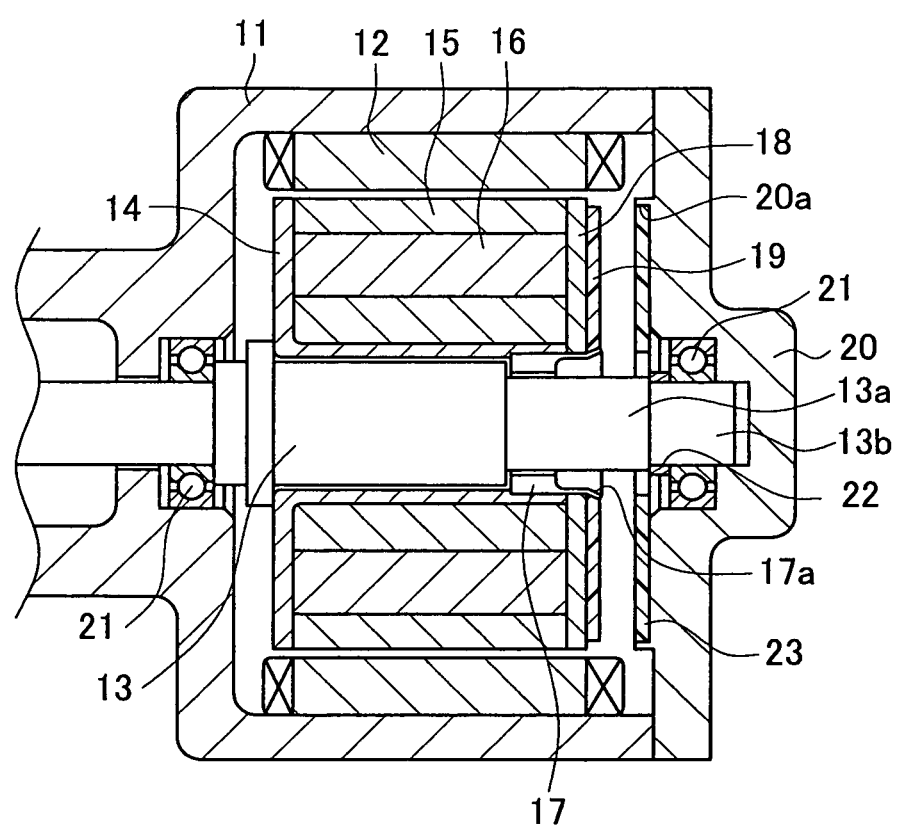
FIG. 1 is a cross sectional view showing a motor structure internally having a resolver in a first embodiment.

FIG. 1 is a cross sectional view of a motor structure internally having a resolver serving as a rotation detector in this embodiment. An outer casing includes a motor casing 11 and a lid casing 20. A motor stator 12 is fixed inside the motor casing 11. In the motor casing 11, furthermore, a bearing (first bearing) 21 is mounted. Similarly, another bearing (second bearing) 21 is mounted in the lid casing 20. A pair of the bearings 21 rotatably support a motor shaft 13 serving as a rotating shaft.

A motor rotor 15 is mounted on the motor shaft 13 through a guide 14. In the motor rotor 15, a permanent magnet 16 is fixedly contained. In FIG. 1, a left end face of the motor rotor 15 is in contact with the guide 14. In FIG. 1, a right end face of the motor rotor 15 is in contact with a shield plate 18 attached thereto. The shield plate 18 is a copper plate. In FIG. 1, a resolver rotor 19 is attached to the right side of the shield plate 18. The details of the resolver rotor 19 will be mentioned later.

The motor shaft 13 is formed with a stepped portion 13a having a smaller diameter than a part of the motor shaft 13 on which the guide 14 is fitted. In FIG. 1, on the right of the stepped portion 13a, a small-diameter stepped portion 13b is formed with a smaller diameter than that of the stepped portion 13a. A stopper 17 is fitted on the stepped portion 13a. In FIG. 1, a right end of the stopper 17 is formed as a caulking portion 17a. The small-diameter stepped portion 13b is in contact with the side surface of an inner ring of the second bearing 21 through a spacer 22.

For manufacturing, the guide 14 is fitted on the motor shaft 13 and then the motor rotor 15 is fitted on the guide 14. Successively, the shield plate 18 and the resolver rotor 19 are fitted on the outer periphery of the caulking portion 17a of the stopper 17 and then the caulking portion 17a of the stopper 17 is caulked outward by a caulking tool not shown. Thus, the guide 14, the motor rotor 15, the shield plate 18, and the resolver rotor 19 are fixed to the motor shaft 13.

In this state, the caulking portion 17a is uniformly caulked with the caulking tool. Accordingly, the resolver rotor 19 can be accurately mounted with respect to the axis of the motor shaft 13.

On the other hand, a resolver stator 23 is fixedly positioned on the inner surface of the lid casing 20. The details of the resolver stator 23 will be described later.

Figure 2:
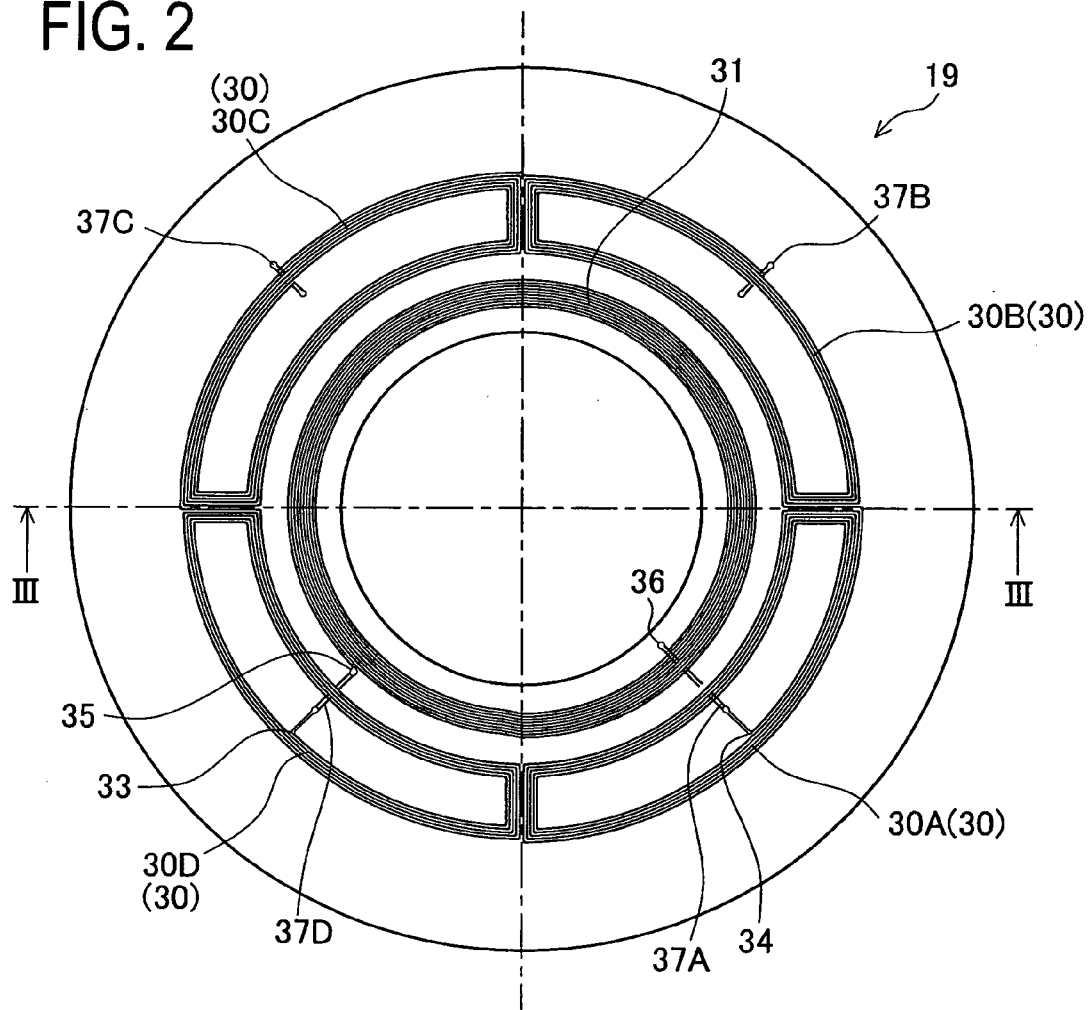
FIG. 2 is a plan view of a resolver rotor in the first embodiment.
Figure 3:
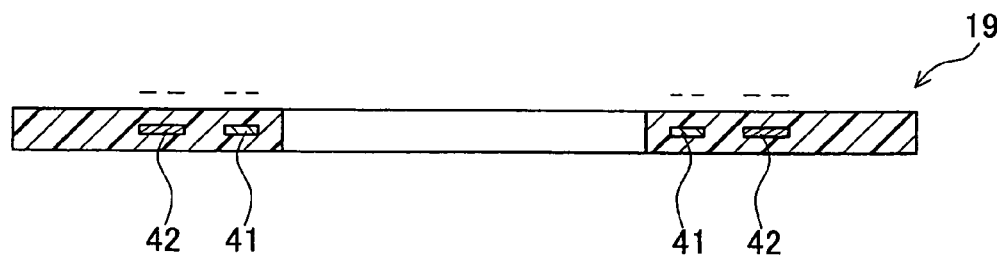
FIG. 3 is a cross sectional view of the resolver rotor taken along a line III-III in FIG. 2 in the first embodiment.

The resolver rotor 19 is explained below. FIG. 2 is a plan view of the resolver rotor 19. FIG. 3 is a cross sectional view of the rotor 19 taken along a line III-III in FIG. 2.

The resolver rotor 19 is of a disc shape centrally formed with a circular center hole. The diameter of this rotor 19 is determined in a range of 100 to 150 mm. The rotor 19 is made of PPS resin or LCP liquid crystal polymer. The thickness thereof is determined in a ranged of 3 to 5 mm.

On one surface of the resolver rotor 19, resolver rotor patterns 30A, 30B, 30C, and 30D (hereinafter, also referred generically to as "resolver rotor pattern(s) 30") are formed at four locations. A rotary transformer pattern 31 is also formed near the center of the rotor 19. The resolver rotor patterns 30 and the rotary transformer pattern 31 are formed by an ink jet printer. Ink used therein is silver paste in which silver particles are dispersed in a dispersant. Specifically, the silver paste is applied with a thickness of 10 to 20 μm on the rotor 19 and then burnt or baked. Burning causes the dispersant to sublimate, thereby forming a silver thin film of a thickness of 2 to 5 μm on the surface. The width of the resolver rotor pattern 30 is 0.5 mm in this embodiment.

On the surfaces of the resolver rotor pattern 30 and the rotary transformer pattern 31, an insulating layer made of polyimide is formed with a thickness of 10 μm. This insulating layer is also made in such a way that polyimide is applied on the surfaces and then burnt.

In the finished resolver rotor 19, a backup core 42 is placed in a position corresponding to an area surrounded by the resolver rotor pattern 30 and a backup core 41 is placed in a position corresponding to the rotary transformer pattern 31. The backup cores 41 and 42 are respectively embedded in the rotor 19 by insert molding. The backup core 42 serves to intensify the magnetic field generated in the resolver stator 23 and the backup core 41 serves to intensify the magnetic field generated in the rotary transformer pattern 31.

As shown in FIG. 2, each of the four resolver rotor patterns 30A, 30B, 30C, and 30D is formed in a loop form in each segment separated at intervals of 90°. After these four patterns 30A to 30D are formed, an insulating layer made of polyimide is formed by burning on the patterns excepting respective terminal portions. On the insulating layer, connecting wires 37A, 37B, 37C, and 37D for connecting the resolver rotor patterns 30A, 30B, 30C, and 30D and the rotary transformer patterns 31 are formed. This connecting wire is formed by an ink jet printer.

Furthermore, an end 34 of the resolver rotor pattern 30A is connected to an end 36 of the rotary transformer pattern 31 through the connecting wire 37A. An end of the resolver rotor pattern 30B is connected to an end of the resolver rotor pattern 30C through the connecting wires 37B and 37C. An end 33 of the pattern 30D is connected to the other end 35 of the rotary transformer pattern 31 through the connecting wire 37D.

Subsequently, an insulating layer made of polyimide is formed by burning on the connecting wires and the terminal portions. Thus, a change in magnetic field induces a current in the resolver rotor patterns 30A to 30D to flow into the rotary transformer pattern 31.

In this embodiment, the connecting wires are formed in multi-layer configuration on the same plane for connection. This connection may be made by utilizing a back surface through holes.

The resolver stator 23 is explained below. This stator 23 is of a disc plate centrally formed with a circular center hole and has a diameter of 100 to 150 mm. The stator 23 is made of PPS resin or LCP liquid crystal polymer and has a thickness of 3 to 5 mm.

As shown in FIG. 1, the resolver stator 23 is fitted and adhered inside a positioning protrusion 20a formed to annularly protrude from the inner surface of the lid casing 20. The stator 23 is thus positioned with respect to the axis of the motor shaft 13 through the bearing 21.

Figure 4:
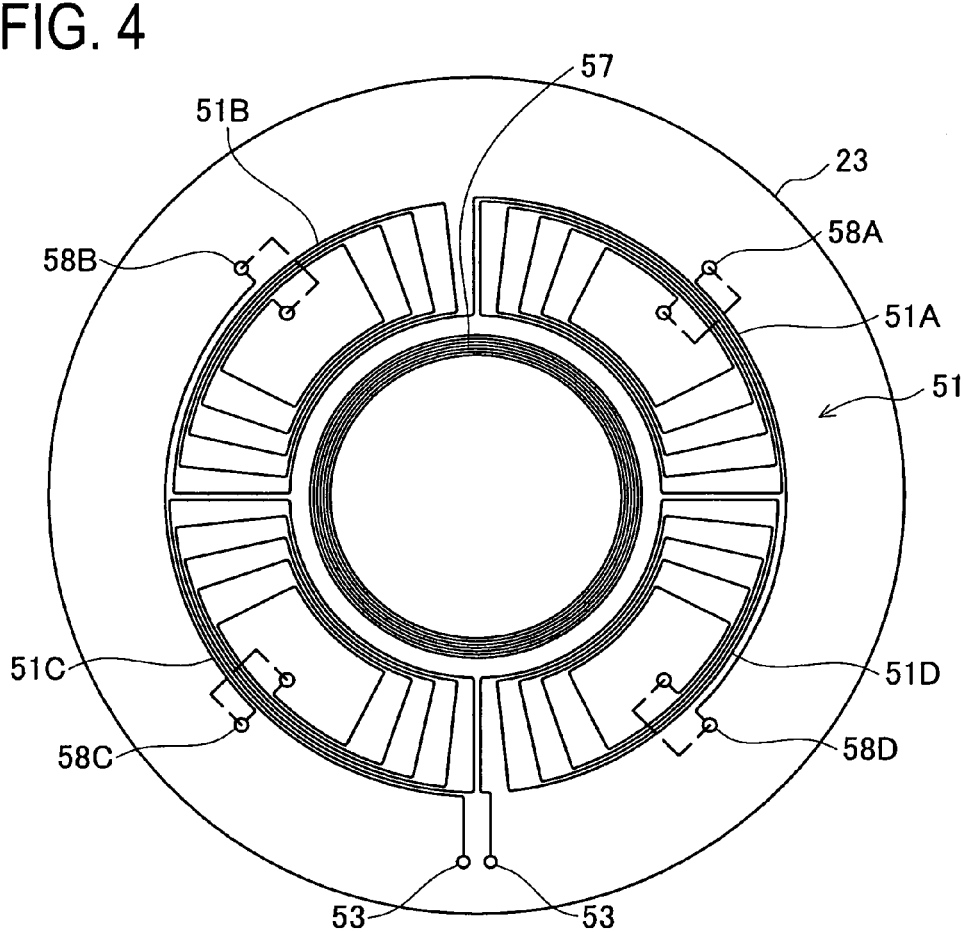
FIG. 4 is a plan view of the resolver stator showing a resolver stator first pattern in the first embodiment.

FIG. 4 shows a resolver stator first pattern 51. On one surface of the resolver stator 23, resolver stator first patterns 51A, 51B, 51C, and 51D are formed at four locations as shown in FIG. 4. A rotary transformer pattern 57 is also formed near the center of the stator 23.

Figure 5:
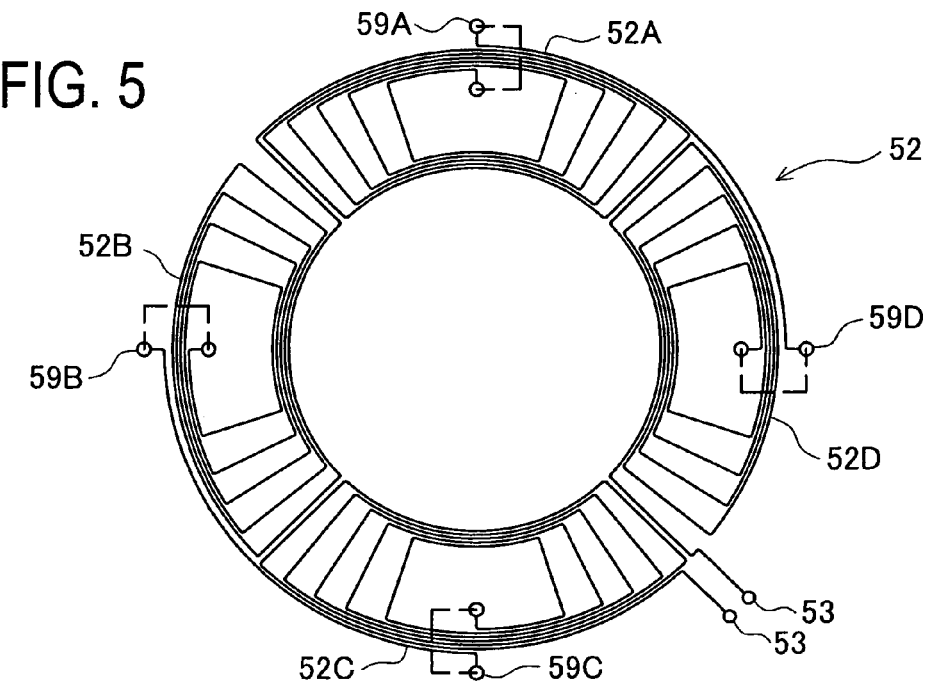
FIG. 5 is a plan view showing a resolver stator second pattern in the first embodiment.

Furthermore, an insulating layer made of polyimide having a thickness of 10 μm is formed on the surfaces of the resolver stator first pattern 51 and the rotary transformer pattern 57. This insulating layer is also made in such a way that polyimide is applied on the surfaces and then burnt. On the insulating layer, a resolver stator second pattern 52 shown in FIG. 5 is formed to overlap with the resolver stator first pattern 51 but with a phase shift of 90° therefrom.

The resolver stator first pattern 51, the rotary transformer pattern 57, and the resolver stator second pattern 52 are formed by the ink jet printer. Ink used therein is silver paste in which silver particles are dispersed in a dispersant. Specifically, the silver paste is applied with a thickness of 10 to 20 μm and then burnt. Burning causes the dispersant to sublimate, thereby forming a silver thin film with a thickness of 2 to 5 μm on corresponding surfaces. The width of each of the resolver stator first pattern 51, the rotary transformer pattern 57, and the resolver stator second pattern 52 is 0.5 mm in this embodiment.

On the surface of the resolver stator second pattern 52, an insulating layer made of polyimide is formed with a thickness of 10 μm. This insulating layer is also made in such a way that polyimide is applied on the surface and then burnt.

Figure 6:
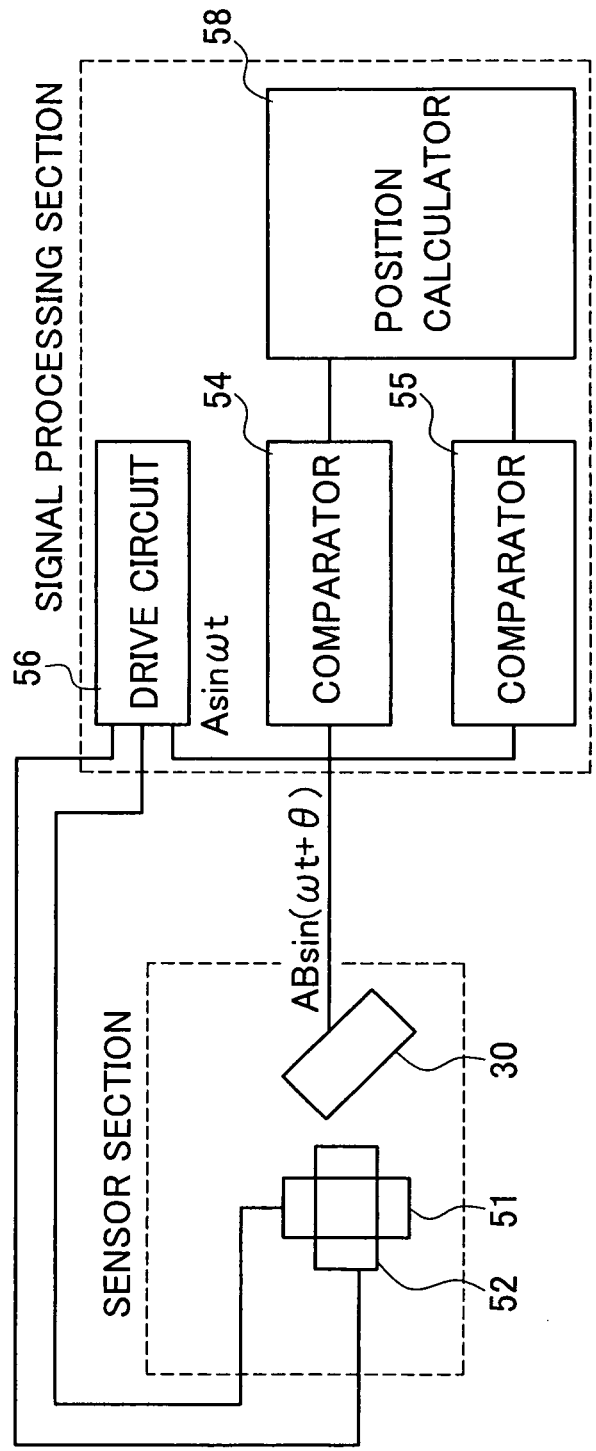
FIG. 6 is a block circuit diagram showing a control configuration of the resolver in the first embodiment.

The four resolver stator first patterns 51A to 51D are connected to each other by connecting wires in a similar manner as explained in FIGS. 2 and 3. As shown in FIG. 4, the first pattern 51 is formed with a pair of input terminals 53. These input terminals 53 are connected to a drive circuit 56 as shown in FIG. 6. FIG. 6 is a block circuit diagram showing a control configuration of the resolver.

As shown in FIG. 5, four resolver stator second patterns 52A, 52B, 52C, and 52D are connected to each other by connecting wires in a similar manner as explained in FIGS. 2 and 3. The second pattern 52 is formed with a pair of input terminals 53. These input terminals 53 are connected to the drive circuit 56 as shown in FIG. 6.

A distance between the resolver rotor pattern 30 on the surface of the resolver rotor 19 and the resolver stator second pattern 52 on the surface of the resolver stator 23 is set at about 1.5 mm in this embodiment.

The control configuration is explained below. As shown in FIG. 6, the drive circuit 56 is connected to the resolver stator first pattern 51 and the resolver stator second pattern 52 respectively and generates a sine wave (A sin ωt) of 7.2 kHz which is a first exciting signal and a cosine wave (A cos ωt) of 7.2 kHz which is a second exciting signal. The resolver stator first pattern 51 is supplied with the sine wave from the drive circuit 56 and the resolver stator second pattern 52 is supplied with the cosine wave from the drive circuit 56. The sine wave and the cosine wave are equal in amplitude and with a phase shift of 90°.

In the resolver rotor pattern 30, AB sin (ωt+θ) which is an output signal is generated as an induced current. The output signal is input to a comparator 54 provided on a stator side through the rotary transformer patterns 31 and 57. On the other hand, the sine wave (A sin ωt) is input from the drive circuit 56 to a comparator 55.

To avoid erroneous detection resulting from noise, a position calculator 58 inputs a predetermined hysteresis voltage to the comparator 54 that detects a zero cross, by setting a dead zone which does not respond to noise as a hysteresis voltage.

Similarly, to avoid erroneous detection resulting from noise, the position calculator 58 inputs a predetermined hysteresis voltage to the comparator 55 that detects a zero cross by setting a dead zone where which does not respond to noise as a hysteresis voltage.

The operation of the resolver having the above configuration is explained below. The resolver stator first pattern 51 is excited by the sine wave (A sin ωt) which is a first exciting signal S1 and the resolver stator second pattern 52 is excited by the cosine wave which is a second exciting signal. Accordingly, the resolver rotor pattern 30 generates AB sin (ωt+θ) which is an output signal S2 as an induced current. The output signal S2 is input to the comparator 54 on the stator side through the rotary transformer patterns 31 and 57. On the other hand, the sine wave (A sin ωt) which is the first exciting signal S1 is input from the drive circuit 56 to the comparator 55. Based on a time lag between a zero cross detecting timing of the comparator 54 and a zero cross detecting timing of the comparator 55, the position calculator 58 calculates a rotation angle of the motor rotor 15.

According to the structure of the motor with rotation detector (resolver) in this embodiment, as explained in detail above, the resolver includes the disc-shaped resolver stator 23 and the disc-shaped resolver rotor 19. The resolver stator 23 is fixed to the lid casing 20 and has the surface on which the resolver stator first pattern 51 and the resolver stator second pattern 52 are formed in thin film or layer shape. The resolver rotor 19 is fixed to the end face of the motor rotor 15 and has the surface on which the resolver rotor pattern 30 is formed in thin film or layer shape. The thin-film-shaped first and second patterns 51 and 52 are placed to face the resolver rotor pattern 30 in the axial direction of the motor shaft 13. Therefore, the resolver can have the reduced length occupied in the axial direction of the motor shaft 13.

The resolver rotor pattern 30 is formed in a thin film pattern on the surface of the resolver rotor 19 by the ink jet printer. Accordingly, the thin-film pattern can be accurately formed with a thickness of 10 μm or less. Since the thin film pattern having a correct width can be formed, the accuracy of the resolver can also be enhanced.

The resolver rotor pattern 30 is fixed to the resolver rotor 19 in such a way that an ink solution comprising silver particles dispersed in a dispersant is applied on the rotor 19 by the ink jet printer and then burnt. The thin-film pattern can therefore be reliably fixed to the rotor 19.

The shield plate 18 is provided between the motor rotor 15 and the resolver rotor 19. The resolver rotor 19 is less influenced by the magnetic field generated by the permanent magnet 16 placed in the motor rotor 15 and the variable magnetic field generated in the motor stator 12. Thus, the rotation angle can be accurately detected. Furthermore, since the shield member is the copper shield plate 18 or copper plating, sufficient shielding can be provided against magnetic fields.

<Second Embodiment>

A second preferred embodiment of the structure of the motor with rotation detector according to the present invention will be described in detail with reference to the accompanying drawing.

The contents in the following embodiments mentioned below are substantially the same as those in the first embodiment and therefore the same parts or components are given the same reference signs as those in the first embodiment without repeating their explanations. The following description is focused on differences from the first embodiment.

Figure 7:
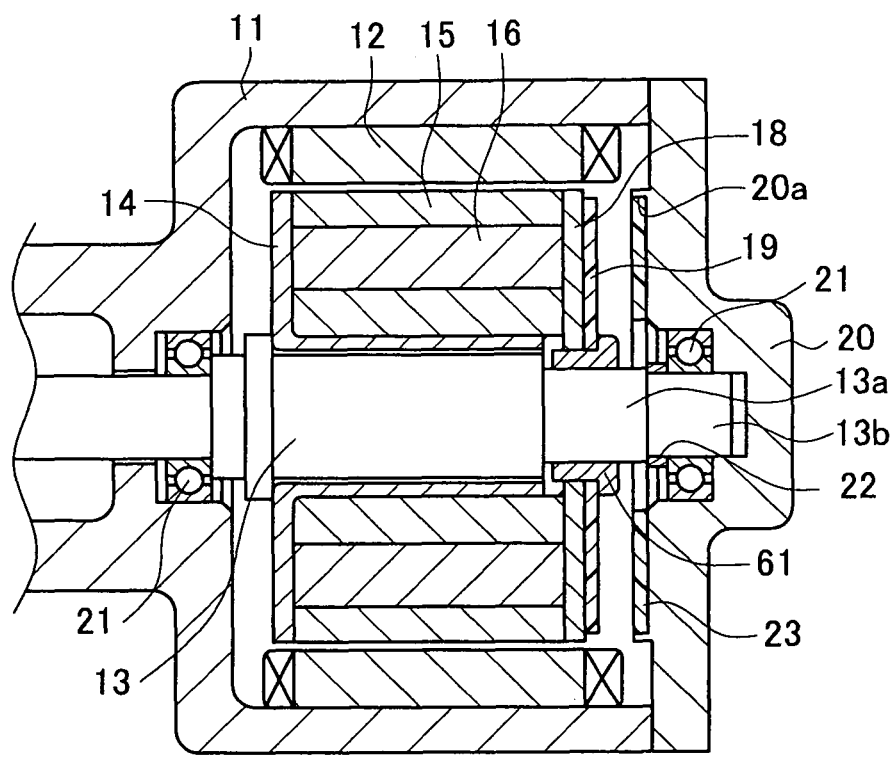
FIG. 7 is a cross sectional view of a motor structure internally having a resolver in a second embodiment.

FIG. 7 is a cross sectional view showing the structure of a motor internally having a resolver. As shown in FIG. 7, the shield plate 18 and the resolver rotor 19 are fixed to the stepped portion 13a of the motor shaft 13 through a spacer 61. To be specific, the spacer 61 is press-fitted between the stepped portion 13a and the inner diameter portions of the shield plate 18 and the resolver rotor 19, thereby positioning and fixing the shield plate 18 and the rotor 19 with respect to the motor shaft 13.

<Third Embodiment>

A third preferred embodiment of the structure of the motor with rotation detector according to the present invention will be explained in detail with the accompanying drawing.

Figure 8:
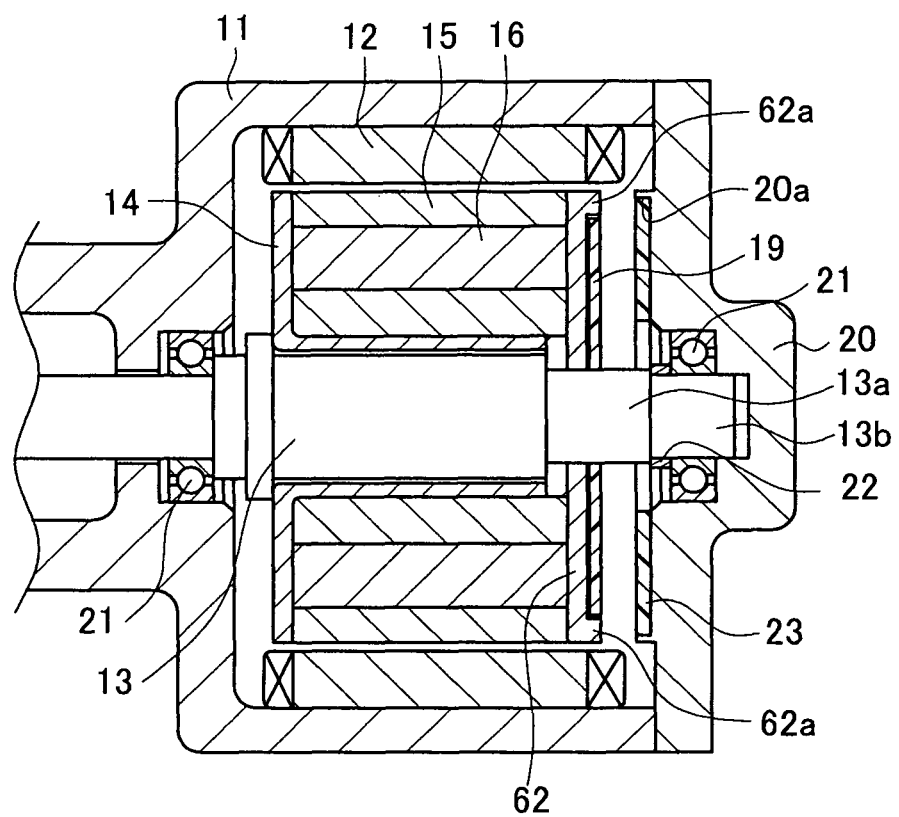
FIG. 8 is a cross sectional view of a motor structure internally having a resolver in a third embodiment.

FIG. 8 is a cross sectional view showing the structure of a motor internally having a resolver. As shown in FIG. 8, a shield plate 62 and the resolver rotor 19 are directly fixed to the stepped portion 13a of the motor shaft 13. To be specific, the stepped portion 13a is fitted in the inner diameter portions of the shield plate 62 and the rotor 19. The shield plate 62 and the rotor 19 are fixed to the motor shaft 13 with an adhesive.

The shield plate 62 includes, at its outermost peripheral edge, an annular protrusion 62a protruding toward the resolver rotor 19. This annular protrusion 62a can enhance shielding ability to the rotor 19.

<Fourth Embodiment>

A fourth preferred embodiment of the structure of the motor with rotation detector according to the present invention will be explained in detail with the accompanying drawing.

Figure 9:
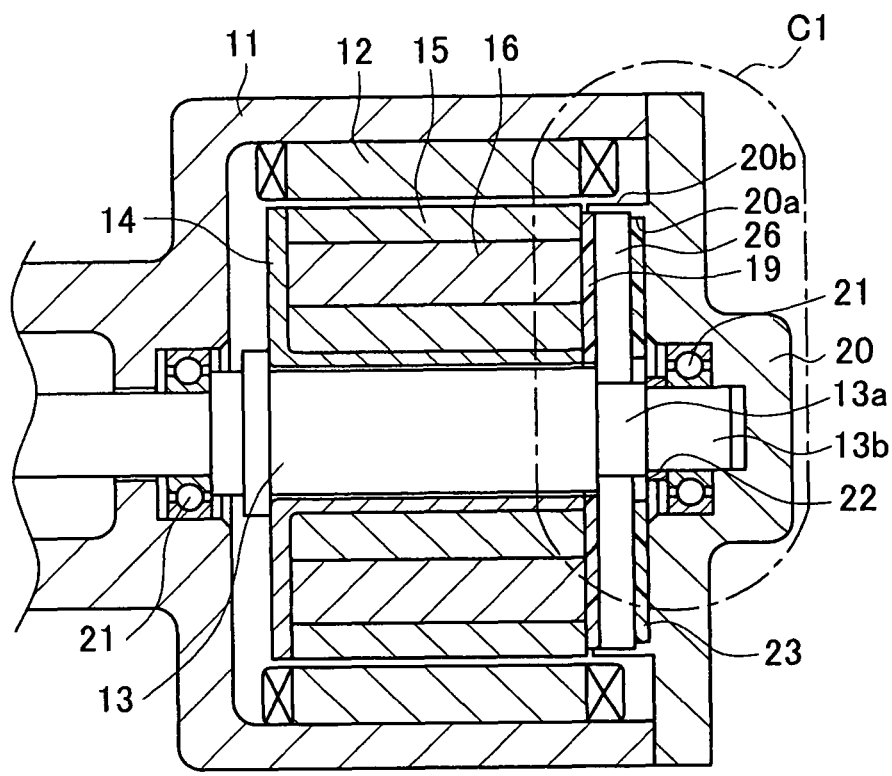
FIG. 9 is a cross sectional view of a motor structure internally having a resolver in a fourth embodiment.
Figure 10:
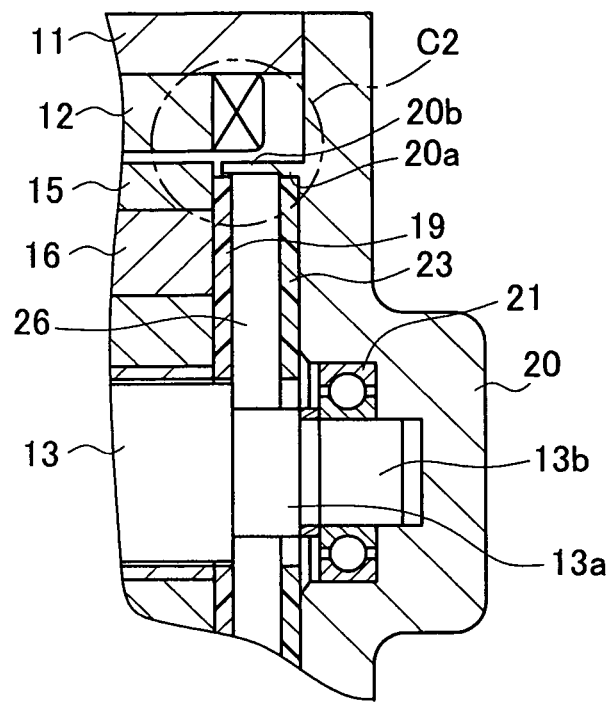
FIG. 10 is a cross sectional view showing part of the motor structure in the fourth embodiment.
Figure 11:
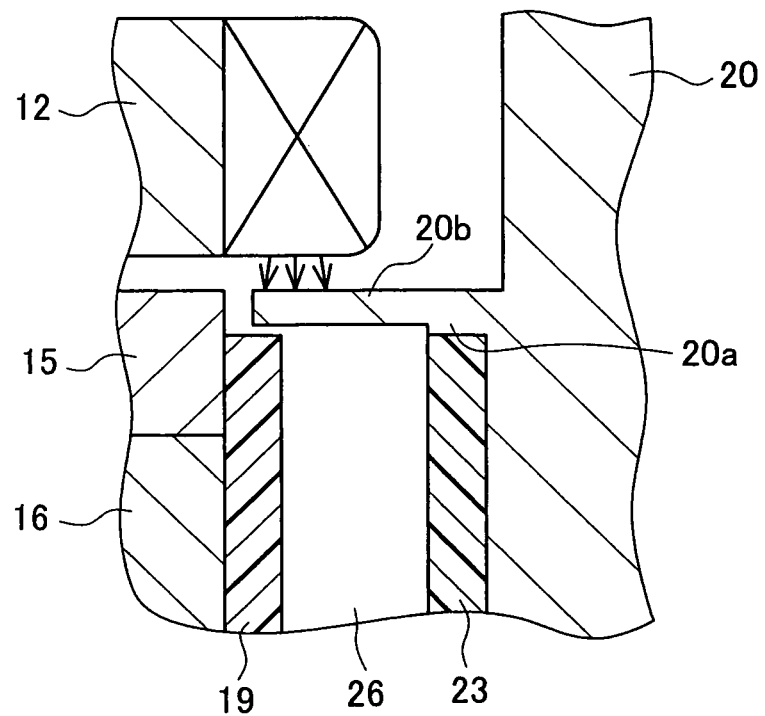
FIG. 11 is an enlarged cross sectional view showing part of the motor structure in the fourth embodiment.

FIG. 9 is a cross sectional view showing the structure of the motor internally having the resolver. FIG. 10 is an enlarged cross sectional view of a section C1 indicated by an elliptic chain line in FIG. 9. FIG. 11 is an enlarged cross sectional view of a section C2 indicated by a circular chain line in FIG. 10, which is a feature in this embodiment.

This embodiment differs from the first embodiment in that the stopper 17 and the shield plate 18 in the first embodiment are eliminated, the stepped portion 13a of the motor shaft 13 is made shorter, and the resolver rotor 19 is directly fixed to one end face of the motor rotor 15. In this embodiment, the lid casing 20 holding the resolver stator 23 is made of a non-magnetic conductive material. The lid casing 20 is integrally formed with a cylindrical portion 20b serving as a shield part cylindrically protruding from the protrusion 20a that holds the outer periphery of the resolver stator 23 to the resolver rotor 19 along the outer circumference of the rotor 19. Herein, aluminum may be adopted as the non-magnetic conductive material.

According to the structure of the motor with rotation detector (resolver) in this embodiment, consequently, the cylindrical portion 20b is formed to protrude from the protrusion 20a of the lid casing 20 and reach the resolver rotor 19. Thus, the magnetic field generated in the motor stator 12 is converted into an eddy current at the cylindrical portion 20b and thus the current changes into heat as shown in FIG. 11. This can reduce an adverse influence of the magnetic field generated in the motor stator 12 with respect to the resolver stator 23 and the resolver rotor 19, so that the resolver can provide improved detection accuracy of the rotation angle. Moreover, the cylindrical portion 20b closes an air gap 26 between the rotor 19 and the stator 23, thereby preventing foreign matters from entering the air gap 26. This makes it possible to prevent breakage and short circuit in the resolver stator first pattern 51, the resolver stator second pattern 52, and the resolver rotor pattern 30, and others. In this regard, reliability of the resolver can be improved. Furthermore, the cylindrical portion 20b having the above function can be integrally formed with the lid casing 20 by use of a mold die. This functional component does not need to be additionally provided and hence the number of components is not increased, providing a large advantage in cost.

<Fifth Embodiment>

A fifth preferred embodiment of the structure of the motor with rotation detector according to the invention will be explained in detail with reference to the accompanying drawing.

Figure 12:
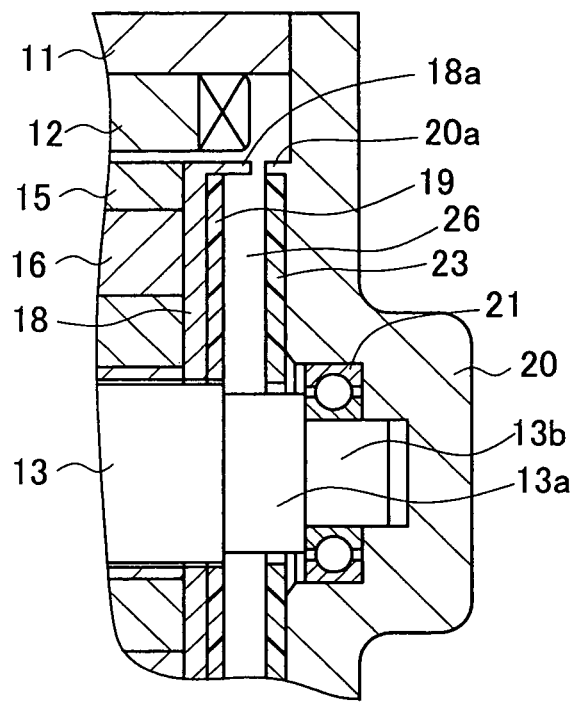
FIG. 12 is a cross sectional view showing part of a motor structure in a fifth embodiment.

FIG. 12 is a cross sectional view of the structure of the motor internally having the resolver. This embodiment primarily differs from the first embodiment in that the stopper 17 in the first embodiment is eliminated and the stepped portion 13a of the motor shaft 13 is made shorter. In this embodiment, the shield plate 18 serving as the shield member is fixed in contact with the right end face of the motor rotor 15. The resolver rotor 19 is fixed to the shield plate 18. The shield plate 18 may be made of aluminum or the like which is a non-magnetic conductive material. This shield plate 18 is integrally formed, at its outer peripheral edge, with a cylindrical portion 18a cylindrically protruding along the outer periphery of the resolver rotor 19 to the vicinity of the resolver stator 23. A distal end of this cylindrical portion 18a faces a distal end of the protrusion 20a holding the resolver stator 23 in the lid casing 20, while providing a clearance between those distal ends.

According to the structure of the motor in this embodiment, the cylindrical portion 18a is formed to protrude from the outer peripheral edge of the shield plate 18 made of the non-magnetic conductive material to the vicinity of the resolver stator 23. Thus, the magnetic field generated in the motor stator 12 is converted into an eddy current at the cylindrical portion 18a and the current changes into heat. This can reduce the adverse influence of the magnetic field with respect to the resolver stator 23 and the resolver rotor 19, so that the resolver can provide improved detection accuracy of the rotation angle. The cylindrical portion 18a closes the air gap 26 between the rotor 19 and the stator 23, thereby preventing foreign matters from entering the air gap 26. This makes it possible to prevent breakage and short circuit in the resolver stator first pattern 51, the resolver stator second pattern 52, and the resolver rotor pattern 30 and others. In this regard, reliability of the resolver can be enhanced. Furthermore, the cylindrical portion 18a having the above function can be integrally formed with the shield plate 18 by use of a mold die. This functional component does not need to be additionally provided. The number of components is not increased, providing a large advantage in cost.

<Sixth Embodiment>

A sixth preferred embodiment of the structure of the motor with rotation detector according to the present invention will be explained in detail with the accompanying drawing.

Figure 13:
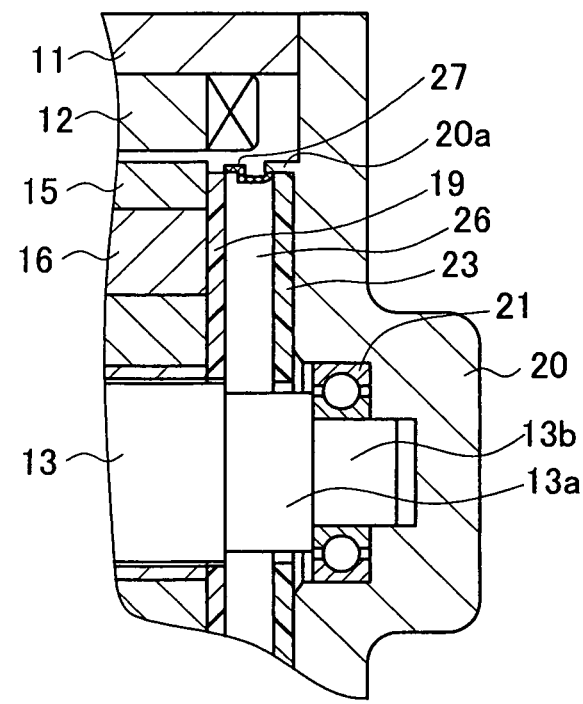
FIG. 13 is a cross sectional view showing part of a motor structure in a sixth embodiment.

FIG. 13 is a cross sectional view of the structure of the motor internally having the resolver. This embodiment differs from the fourth embodiment in that the protrusion 20a of the lid casing 20 is made somewhat longer than in the fourth embodiment and a cylindrical shield member 27 made of a non-magnetic conductive material is placed so as to extend from the protrusion 20a to the resolver rotor 19. A base end of this shield member 27 is fixed to the inner surface of the protrusion 20a and a distal end of the shield member 27 is located to cover the outer peripheral edge of the rotor 19. Aluminum and others may be adopted as the non-magnetic conductive material.

According to the motor structure in this embodiment, consequently, the cylindrical shield member 27 made of the non-magnetic conductive material is placed extending from the protrusion 20a of the lid casing 20 to the outer peripheral edge of the resolver rotor 19. Thus, the magnetic field generated in the motor stator 12 is converted into an eddy current at the shield member 27 and thus changes into heat. This can reduce the adverse influence of the magnetic field with respect to the resolver stator 23 and the resolver rotor 19, so that the resolver can provide improved detection accuracy of the rotation angle. Moreover, the cylindrical shield member 27 closes an air gap 26 between the rotor 19 and the stator 23, thereby preventing foreign matters from entering the air gap 26. This makes it possible to prevent breakage and short circuit in the resolver stator first pattern 51, the resolver stator second pattern 52, and the resolver rotor pattern 30, and others. In this regard, reliability of the resolver can be improved. In addition, the shield member 27 may be made of a material providing a higher shielding effect than the lid casing 20 and thus the shielding effect of the magnetic field can be enhanced as compared with that in the first embodiment.

<Seventh Embodiment>

A seventh preferred embodiment of the structure of the motor with rotation detector according to the present invention will be explained in detail with the accompanying drawing.

Figure 14:
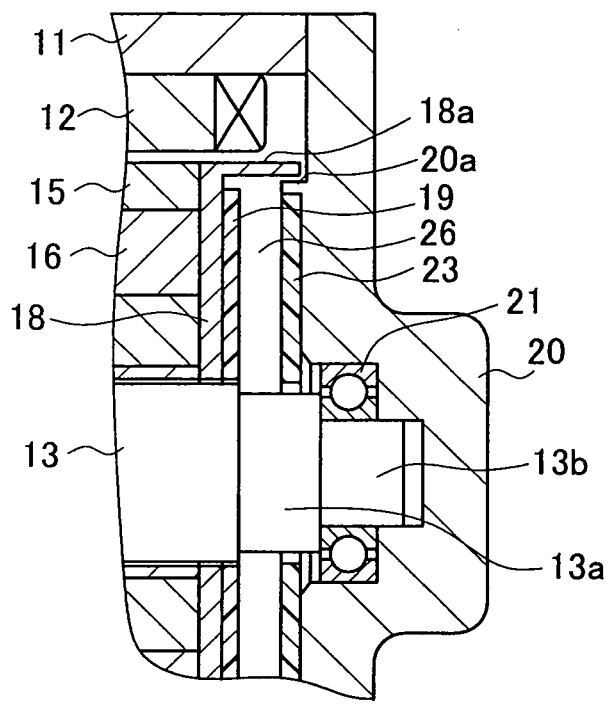
FIG. 14 is a cross sectional view showing part of a motor structure in a seventh embodiment.

FIG. 14 is a cross sectional view of the structure of the motor internally having the resolver. This embodiment differs from the fifth embodiment in that a distal end of the cylindrical portion 18a of the shield plate 18 faces the outer periphery of the protrusion 20a holding the resolver stator 23.

The motor structure in this embodiment can provide the similar operations and effects to those in the fifth embodiment. In addition, since the distal end of the cylindrical portion 18a faces the outer periphery of the protrusion 20a, the air gap 26 between the resolver rotor 19 and the resolver stator 23 is more closely closed, thereby more effectively preventing foreign matters from entering the air gap 26.

<Eighth Embodiment>

An eighth preferred embodiment of the structure of the motor with rotation detector according to the invention will be explained in detail with reference to the accompanying drawing.

Figure 15:
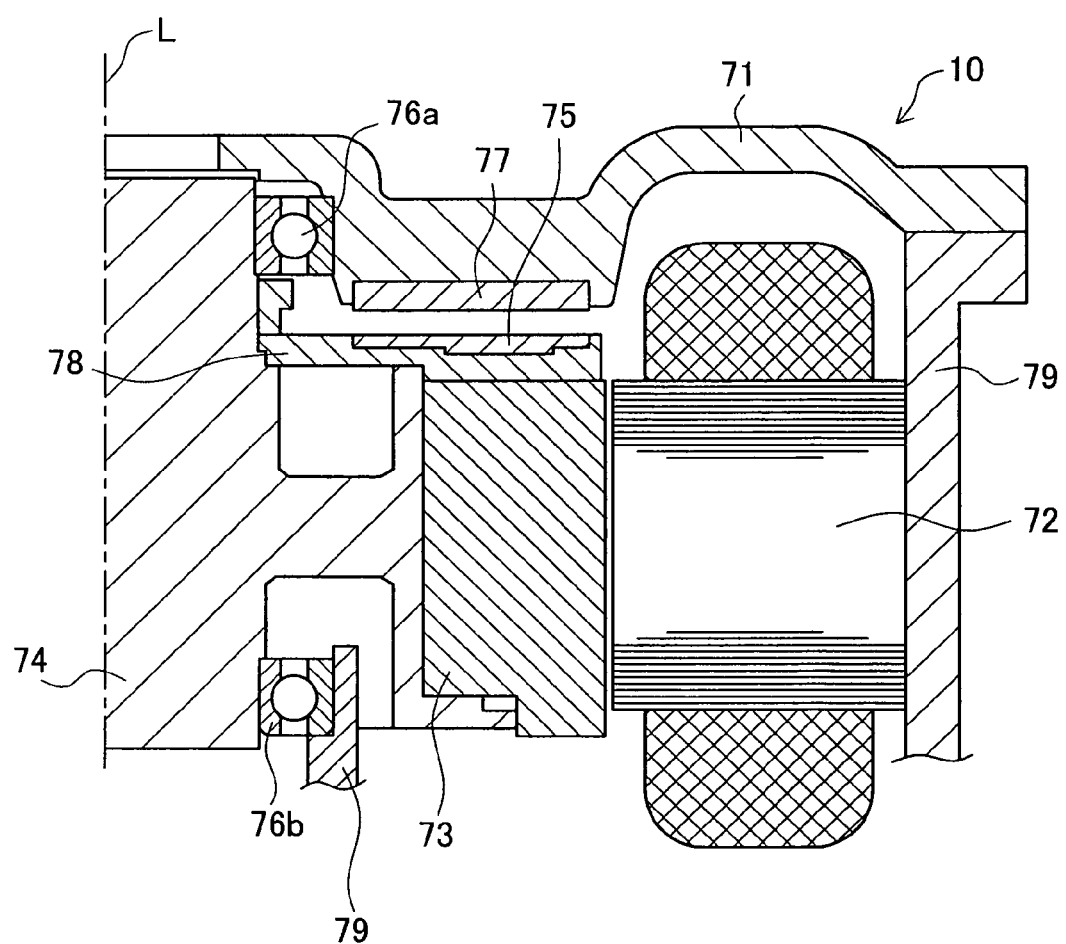
FIG. 15 is a cross sectional view showing part of a motor structure in an eighth embodiment.

FIG. 15 is a schematic cross sectional view of the structure of the motor internally having the resolver. A motor 10 is a brushless motor including a case body 79, a case cover 71, a motor stator 72, a motor rotor 73, a motor shaft 74 serving as a rotating shaft, and a pair of motor bearings 76a and 76b. The case body 79 and the case cover 71 are made of aluminum base alloy or the like by casting. The bearing 76b is fitted in the case body 79 and the bearing 76a is fitted in the case cover 71. Those bearings 76a and 76b support the motor shaft 74 rotatably.

The motor stator 72 is fixed to the inner peripheral surface of the case body 79. The motor stator 72 includes a coil that generates a magnetic force when energized.

The motor rotor 73 includes a permanent magnet and is fixed to the motor shaft 74. The motor stator 72 and the motor rotor 73 are held apart at a predetermined distance. Energization of the stator 72 causes the rotor 73 to rotate, generating a driving force, thereby supplying power to the motor shaft 74. On the end face of the rotor 73, a resolver rotor 75 is fixed through a shield plate 78 which is a non-magnetic conductive body. The shield plate 78 formed of a non-magnetic flat plate is made of a copper plate in this embodiment but may be made of brass or aluminum.

The resolver stator 77 is fixed to the case cover 71. While the case body 79 and the cover 71 are assembled, the resolver rotor 75 and the resolver stator 77 are placed apart at a predetermined distance. This predetermined distance is preferably shorter because the resolver 80 can provide more improved detection accuracy, but it is determined in consideration of dimensional tolerance, dimensional changes resulting from temperature, and others.

Figure 16:
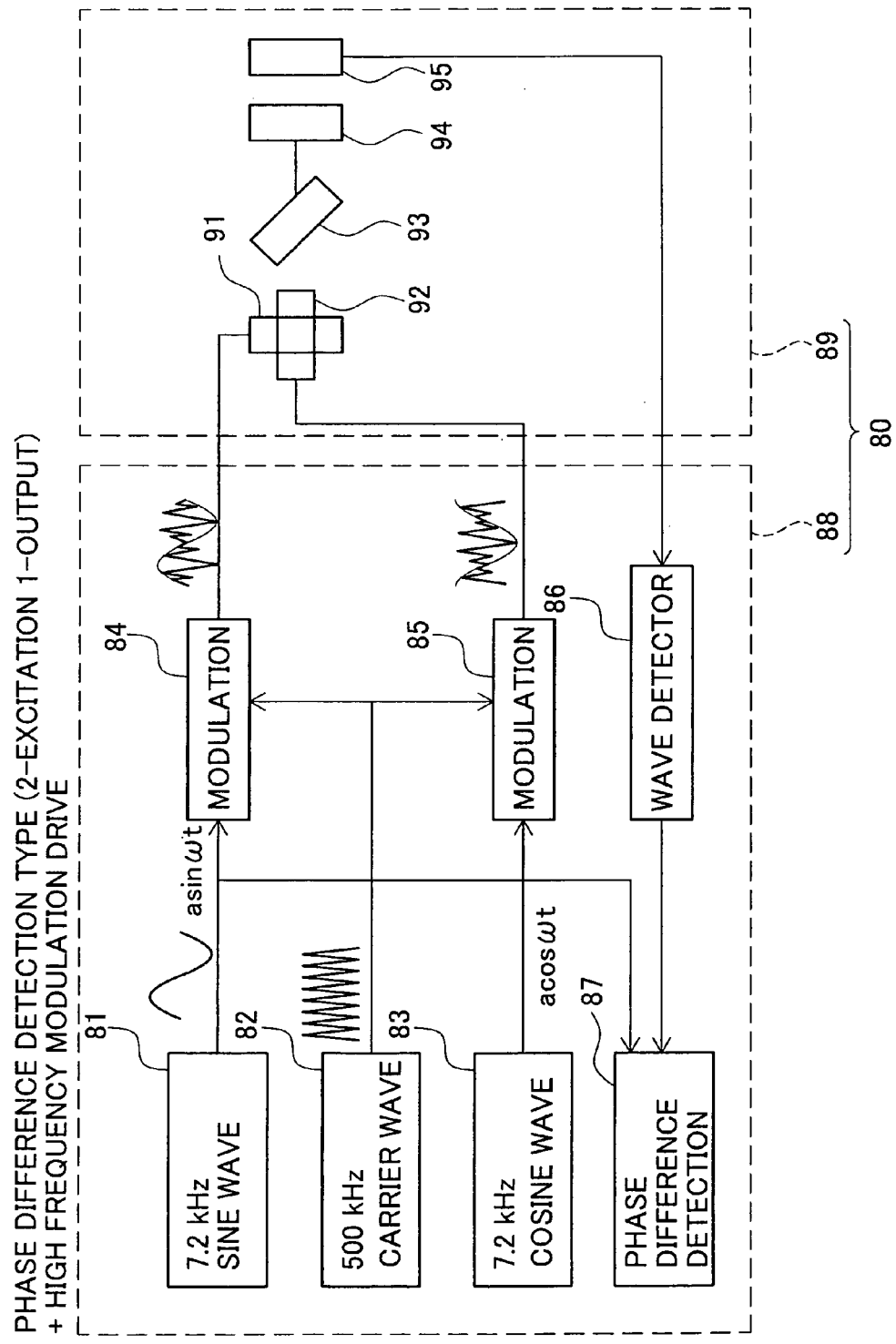
FIG. 16 is a block circuit diagram showing a configuration for position detection control of the resolver in the eighth embodiment.

FIG. 16 is a block circuit diagram showing the structure for position detection control of the resolver. The resolver 80 includes a circuit 88 and a sensor section 89 and is configured as a 2X type resolver that produces 2-cycle angle output in one rotor revolution. The circuit 88 includes an SIN signal generator 81, a carrier wave generator 82, a COS signal generator 83, a first modulator 84, a second modulator 85, and a wave detector 86, and a phase difference detector 87. The sensor section 89 includes an SIN signal exciting coil 91, a COS signal exciting coil 92, a detecting coil 93, a rotor-side rotary transformer 94, and a stator-side rotary transformer 95.

The SIN signal generator 81 that generates an SIN signal wave of 7.2 kHz is connected to the first modulator 84 as shown in FIG. 16. The COS signal generator 83 that generates a COS signal wave of 7.2 kHz is connected to the second modulator 85. Furthermore, the carrier wave generator 82 that generates a carrier wave of 500 kHz is connected to the first modulator 84 and the second modulator 85 respectively. The SIN signal generator 81 is also connected to the phase difference detector 87. The wave detector 86 is connected to the phase difference detector 87. The first modulator 84 is connected to the SIN signal exciting coil 91 and the second modulator 85 is connected to the COS signal exciting coil 92. The detecting coil 93 is connected to the rotor-side rotary transformer 94. The stator-side rotary transformer 95 is connected to the wave detector 86.

The following explanation is given to the details of the structures of the SIN signal exciting coil 91 and the COS signal exciting coil 92.

Figure 17:
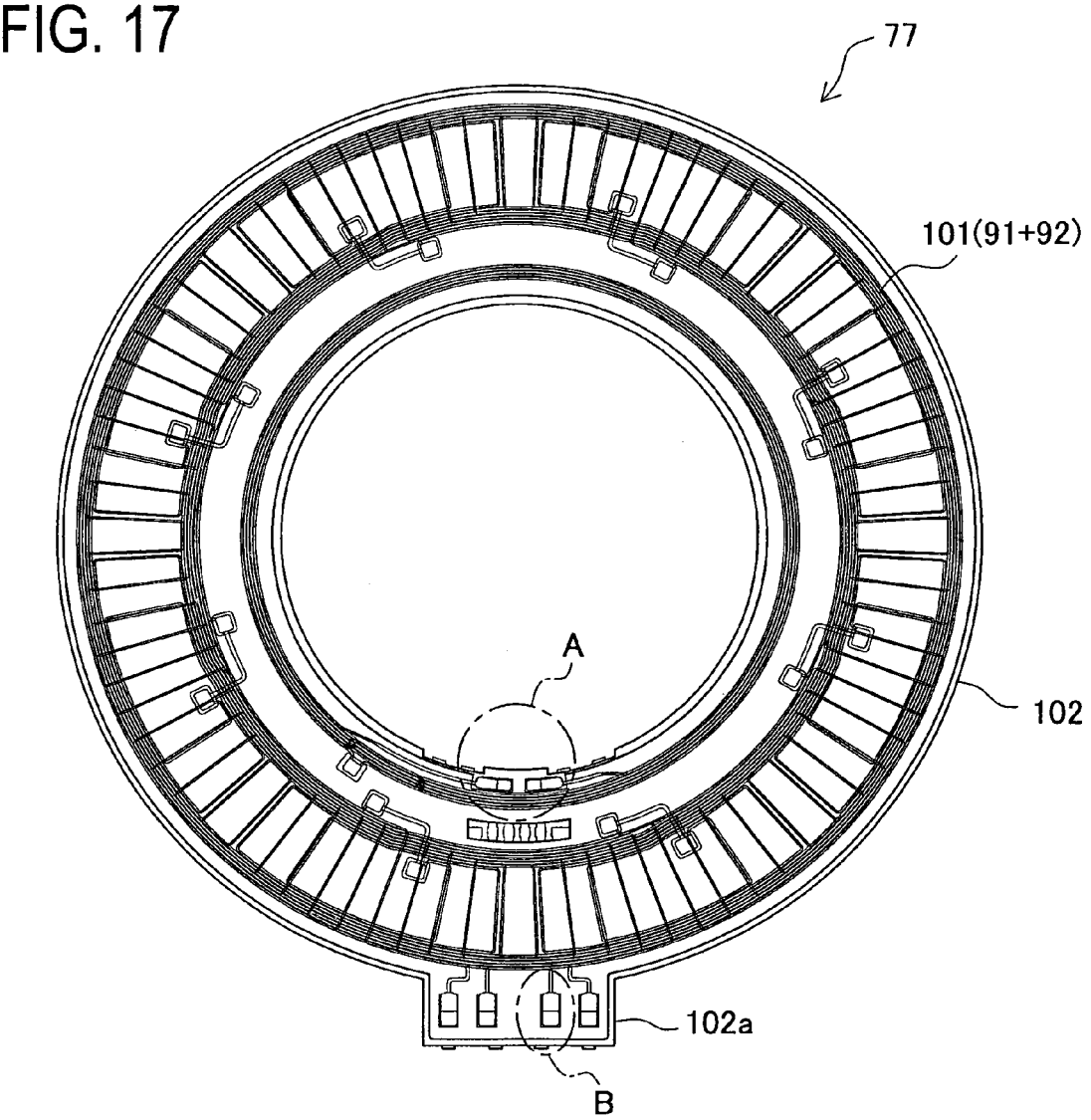
FIG. 17 is a plan view showing a configuration of a resolver stator in the eighth embodiment.
Figure 18:
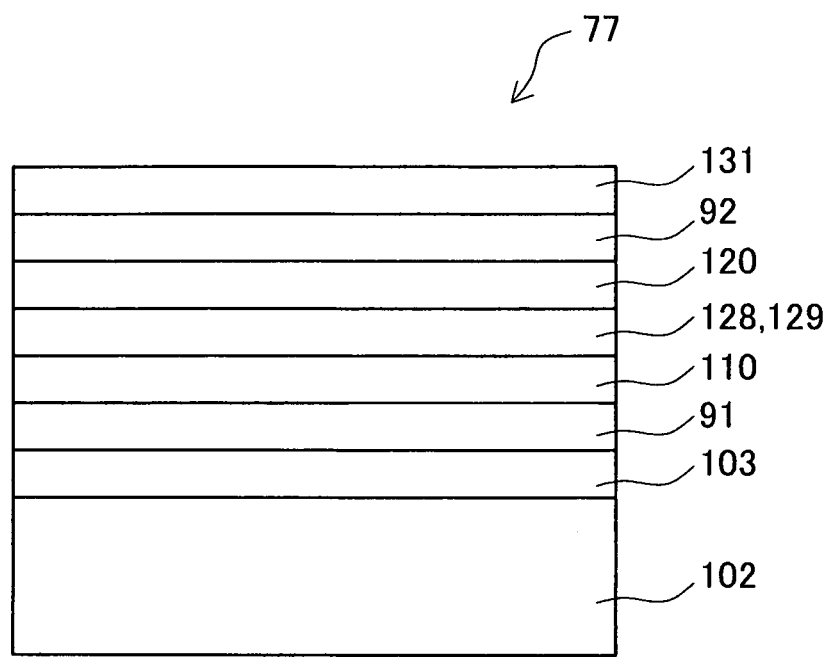
FIG. 18 is a schematically cross sectional view of a resolver stator structure in the eighth embodiment.

FIG. 17 is a plan view showing the structure of the resolver stator 77. FIG. 18 is a schematic cross sectional view showing the structure of the resolver stator 77. As shown in FIG. 18, the resolver stator 77 is configured such that the SIN signal exciting coil 91, a first insulating coat 110, jumper wires 128 and 129, a second insulating coat 120, the COS signal exciting coil 92, and an insulating overcoat 131 are laminated in sequence on a base plate 102 whose surface is formed with a base coat 103. Each of the layers is explained below.

Figure 19:
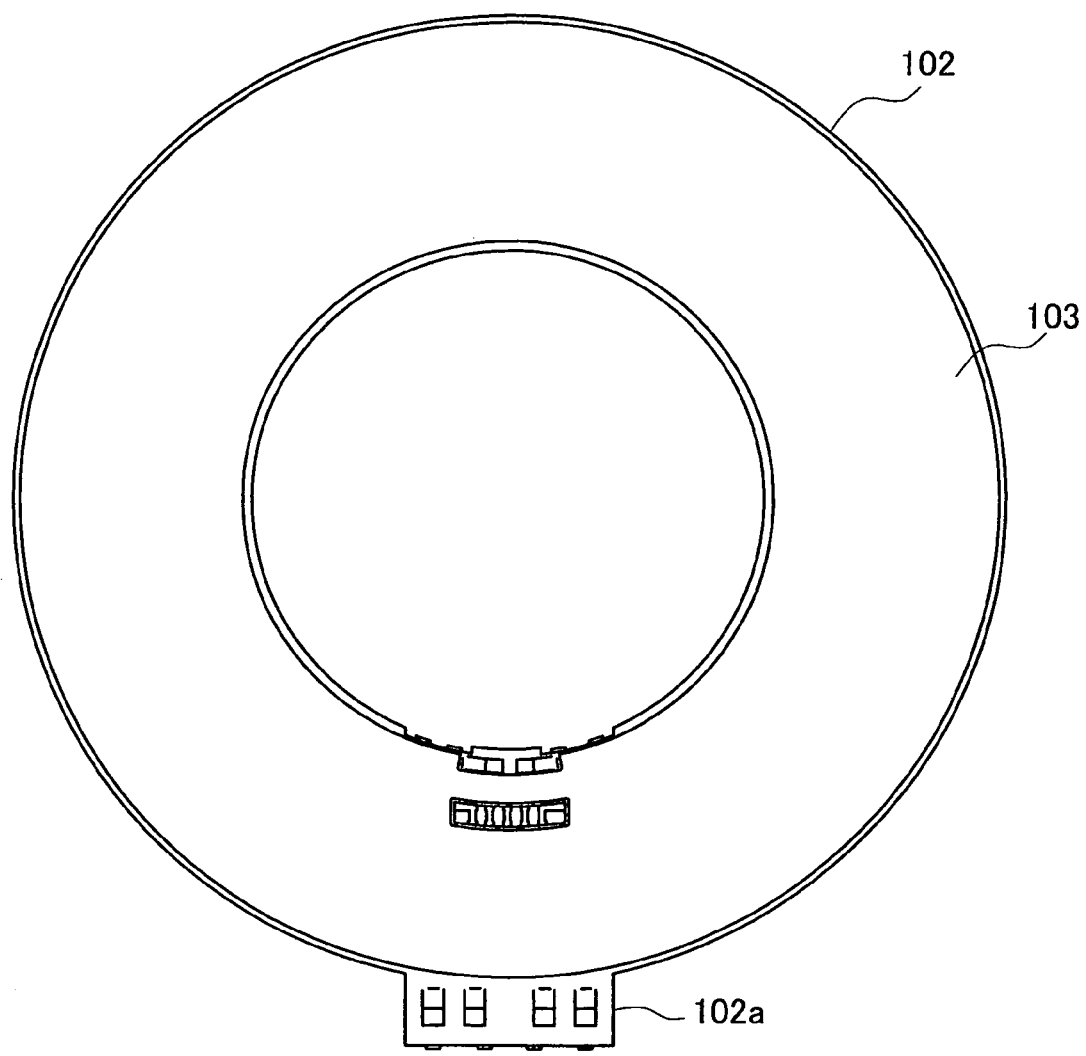
FIG. 19 is a plan view showing a state where a base coat is formed on an upper surface of a base plate in the eighth embodiment.

As shown in FIG. 17, the base plate 102 is of an annular flat plate made of PPS resin. The base plate 102 is formed at its outer periphery with a protrusion 102a provided with connecting terminals. FIG. 19 is a plan view showing a state where the base coat 103 is formed on the upper surface of the base plate 102. The base coat 103 is not formed on the upper surface of the protrusion 102a. The base coat 103 is to smoothen the surface of the base plate 102.

Figure 20:
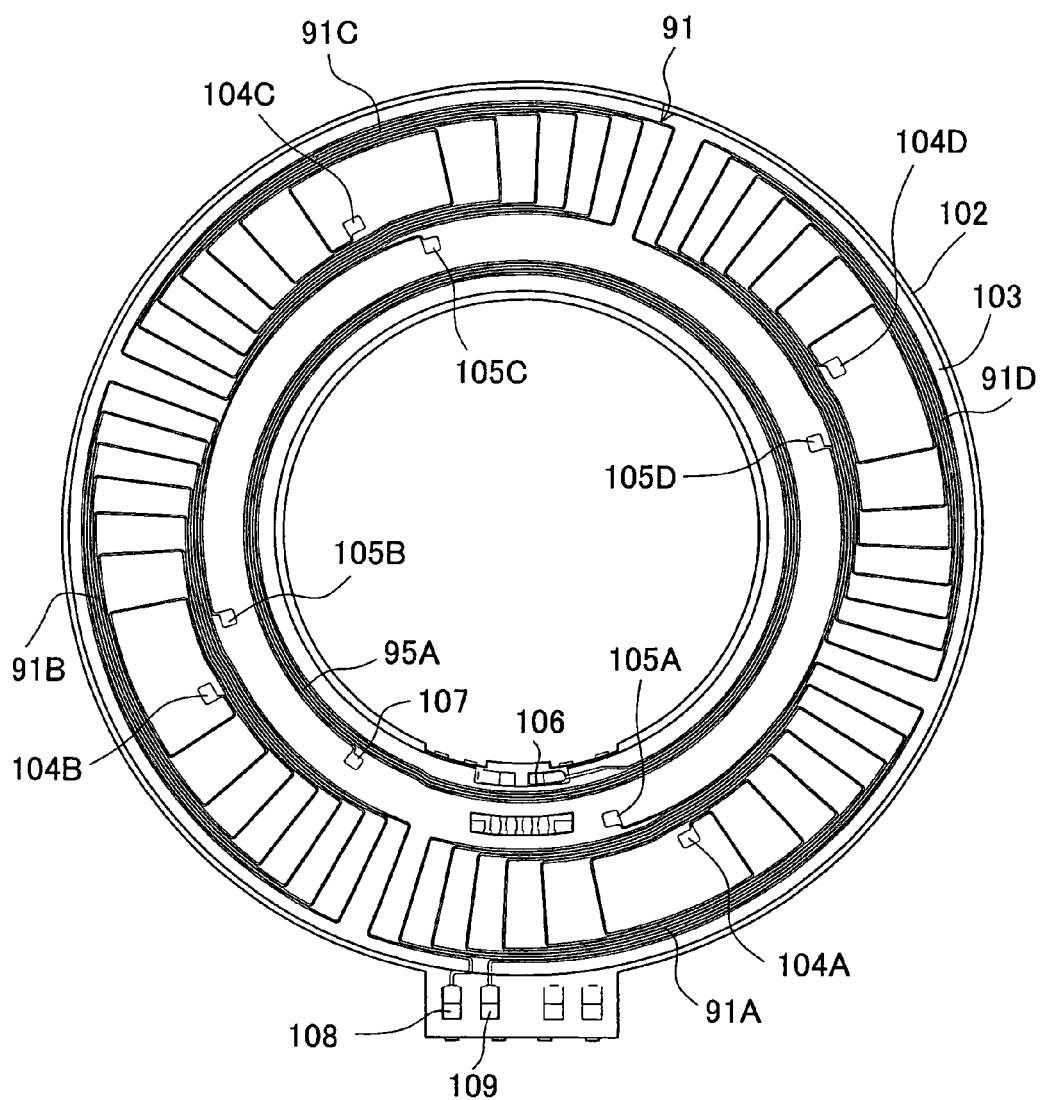
FIG. 20 is a plan view showing a state where an SIN signal exciting coil is formed on an upper surface of the base coat in the eighth embodiment.

FIG. 20 is a plan view showing a state where the SIN signal exciting coil 91 is applied and formed on the upper surface of the base coat 103 by use of the ink jet printer. The SIN signal exciting coil 91 includes four SIN signal exciting coils 91A, 91B, 91C, and 91D placed in displaced positions at an angle of 90° each. The number of turns of each coil is seven. The four SIN signal exciting coils 91A to 91D have inner peripheral ends 104A, 104B, 104C, and 104D on the inner periphery side and the outer peripheral ends 105A, 105B, 105C, and 105D on the outer periphery side, respectively. Each of the coils 91A to 91D is wound sequentially from each inner peripheral end 104 (104A to 104D) toward the outer periphery while providing a slight clearance between turns, forming seven turns, and ending up with the outer peripheral end 105 (105A to 105D).

One end of the SIN signal exciting coil 91A is connected to an external terminal 109. One end of the SIN signal exciting coil 91B is connected to an external terminal 108. A transformer 95A constituting a part of the stator-side rotary transformer 95 is applied on the inner periphery side relative to the SIN signal exciting coil 91 by the ink jet printer. One end of the transformer 95A is connected to an external terminal 106. The other end of the transformer 95A is connected to a transformer end 107.

Figure 21:
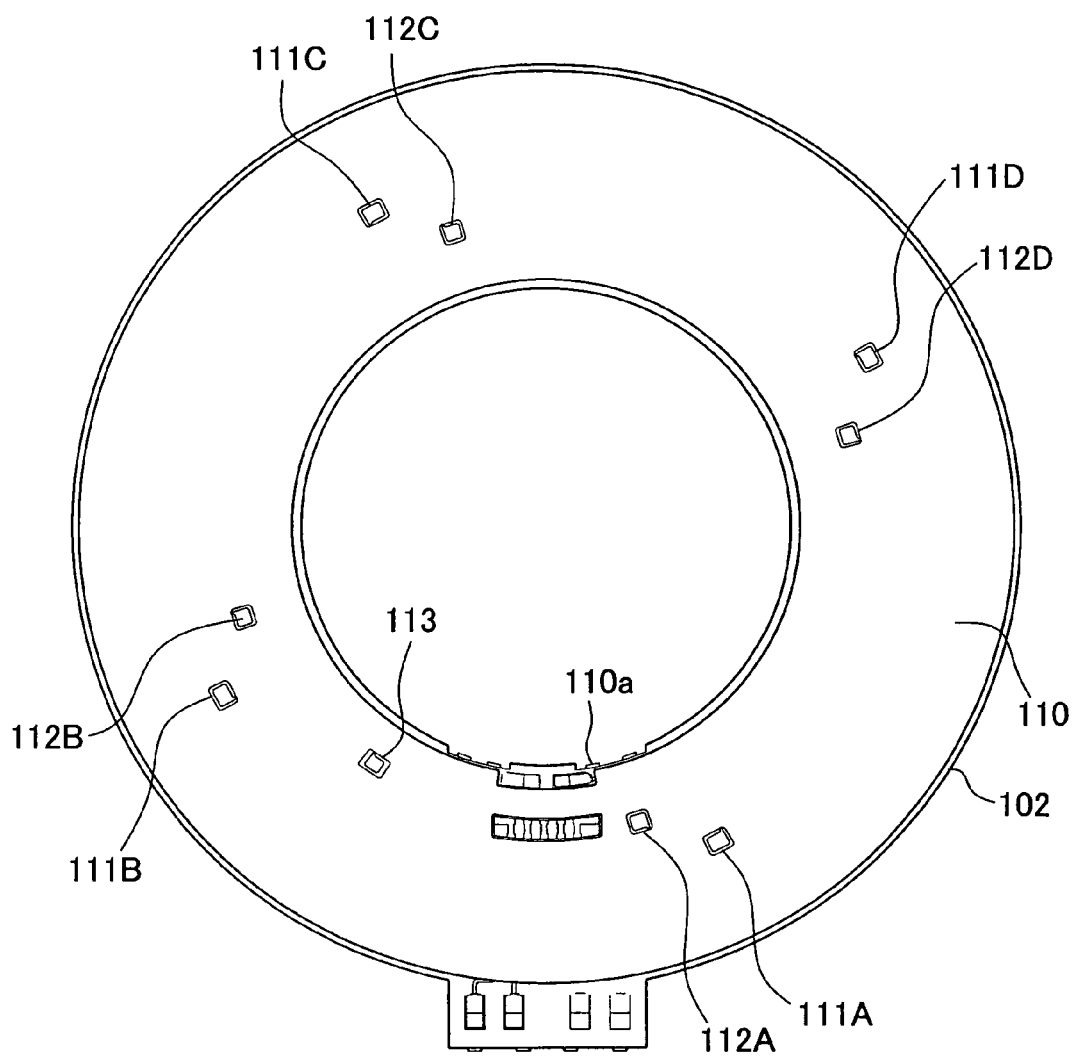
FIG. 21 is a plan view showing a state where an insulating coat is coated on the SIN signal exiting coil in the eighth embodiment.

FIG. 21 is a plan view showing the first insulating coat 110 coated on the SIN signal exciting coil 91. The first insulating coat 110 is formed with through holes 111A, 111B, 111C, and 111D in positions corresponding to the inner peripheral ends 104A to 104D respectively. The first insulating coat 110 is also formed with through holes 112A, 112B, 112C, and 112D in positions corresponding to the outer peripheral ends 105A to 105D respectively. The first insulating coat 110 is further formed with a through hole 113 in a position corresponding to the transformer end 107. In addition, the first insulating coat 110 is formed with a cutout portion 110a in a position corresponding to the external terminal 106. A wiring method utilizing the through holes will be explained later.

Figure 22:
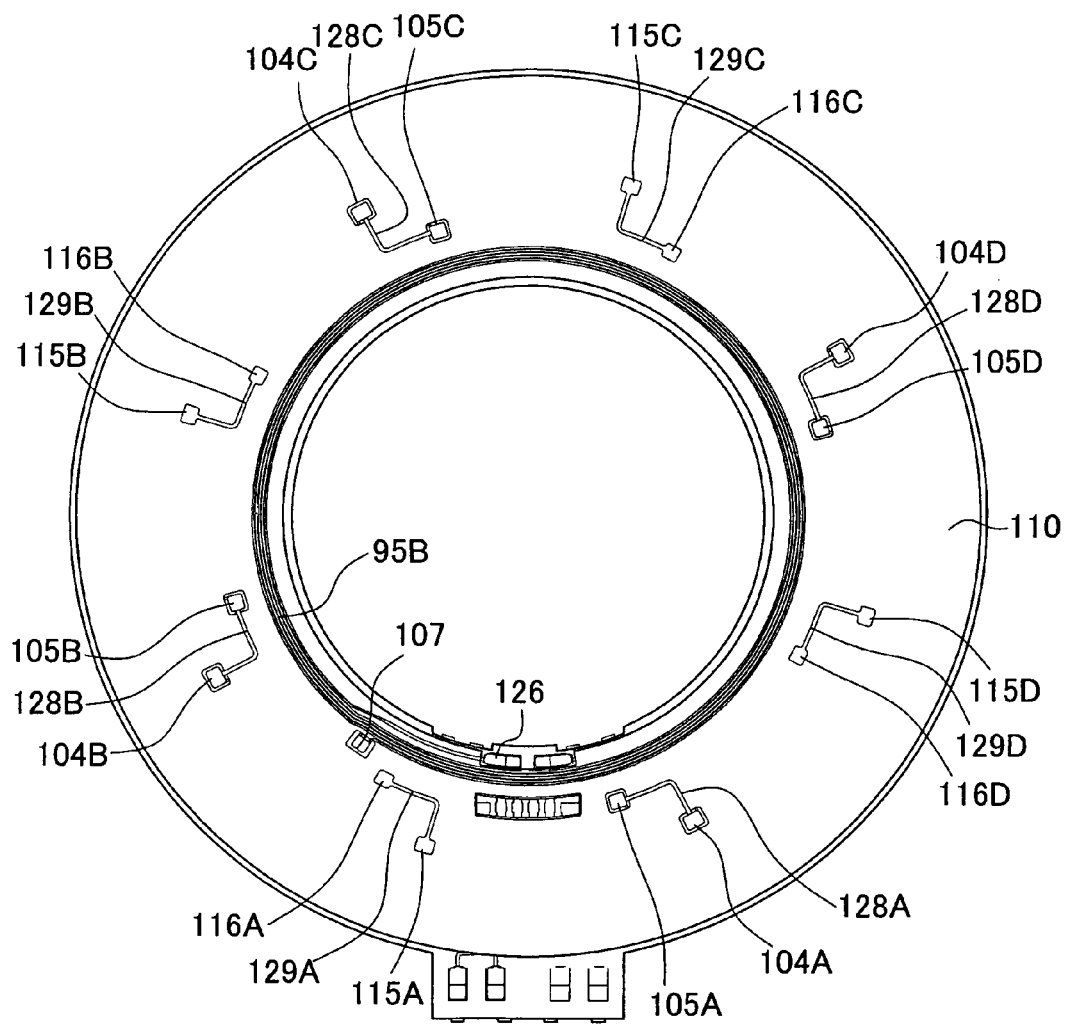
FIG. 22 is a plan view showing a state where jumper wires are formed on an upper surface of the insulating coat in the eighth embodiment.
Figure 24:
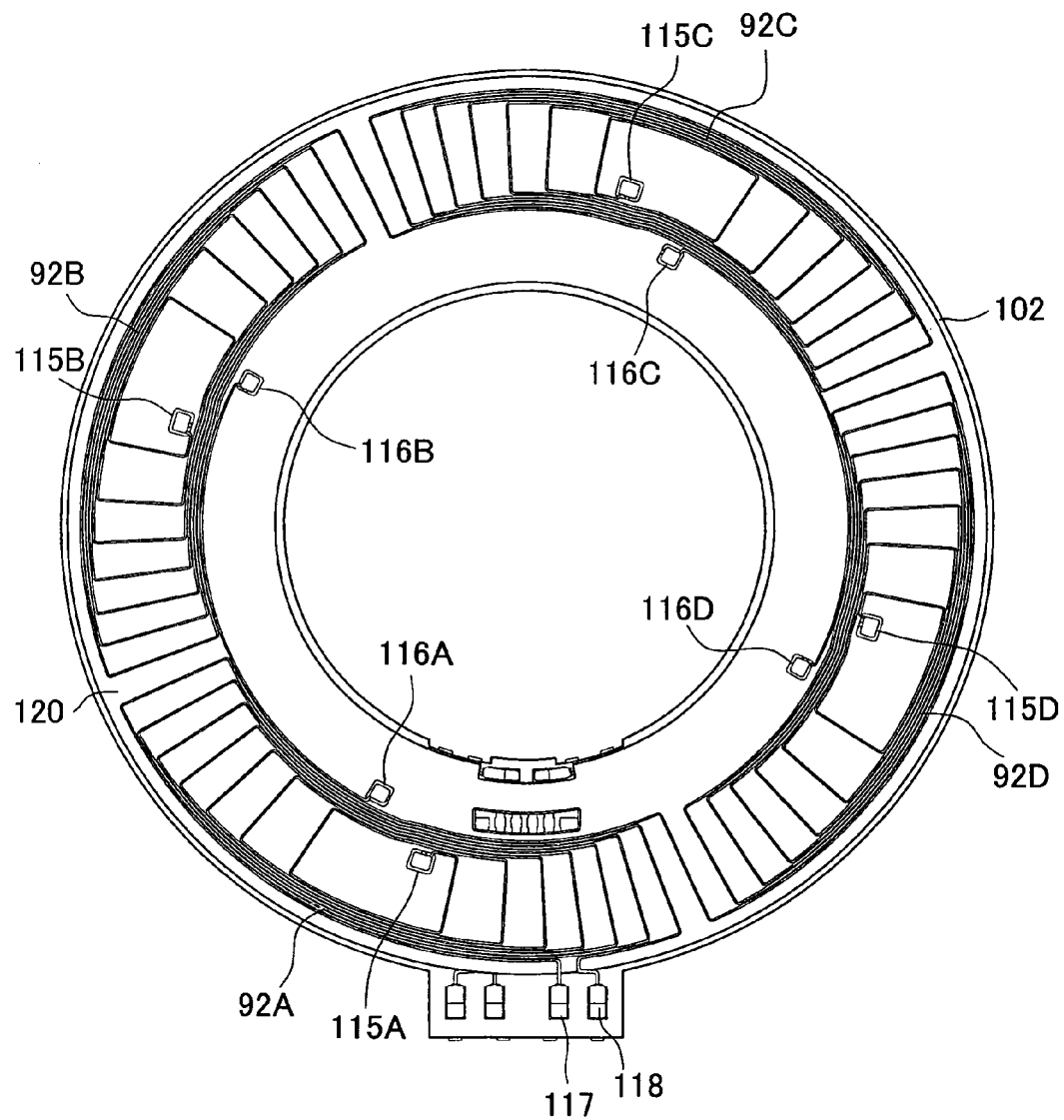
FIG. 24 is a plan view showing a state where a COS signal exciting coil is formed on an upper surface of the second insulating coat in the eighth embodiment.

FIG. 22 is a plan view showing a state where the jumper wires 128A to 128D and 129A to 129D are applied and formed on the upper surface of the first insulating coat 110 by the ink jet printer. The jumper wires 128A to 128D are jumper wires for the SIN signal exciting coil 91 and the jumper wires 129A to 129D are jumper wires for the COS signal exciting coil 92. The details of the jumper wires 128A to 128D and 129A to 129D will be explained later after the details of the COS signal exciting coil 92 in FIG. 24 are explained.

As shown in FIG. 22, the transformer 95B constituting a part of the stator-side rotary transformer 95 is applied on the first insulating coat 110 on the inner periphery side relative to the jumper wires 128A to 128D and 129A to 129D by the ink jet printer. One end of the transformer 95B is connected to an external terminal 126. The other end of the transformer 95B is connected to a transformer end 107 through the through hole 113.

Figure 23:
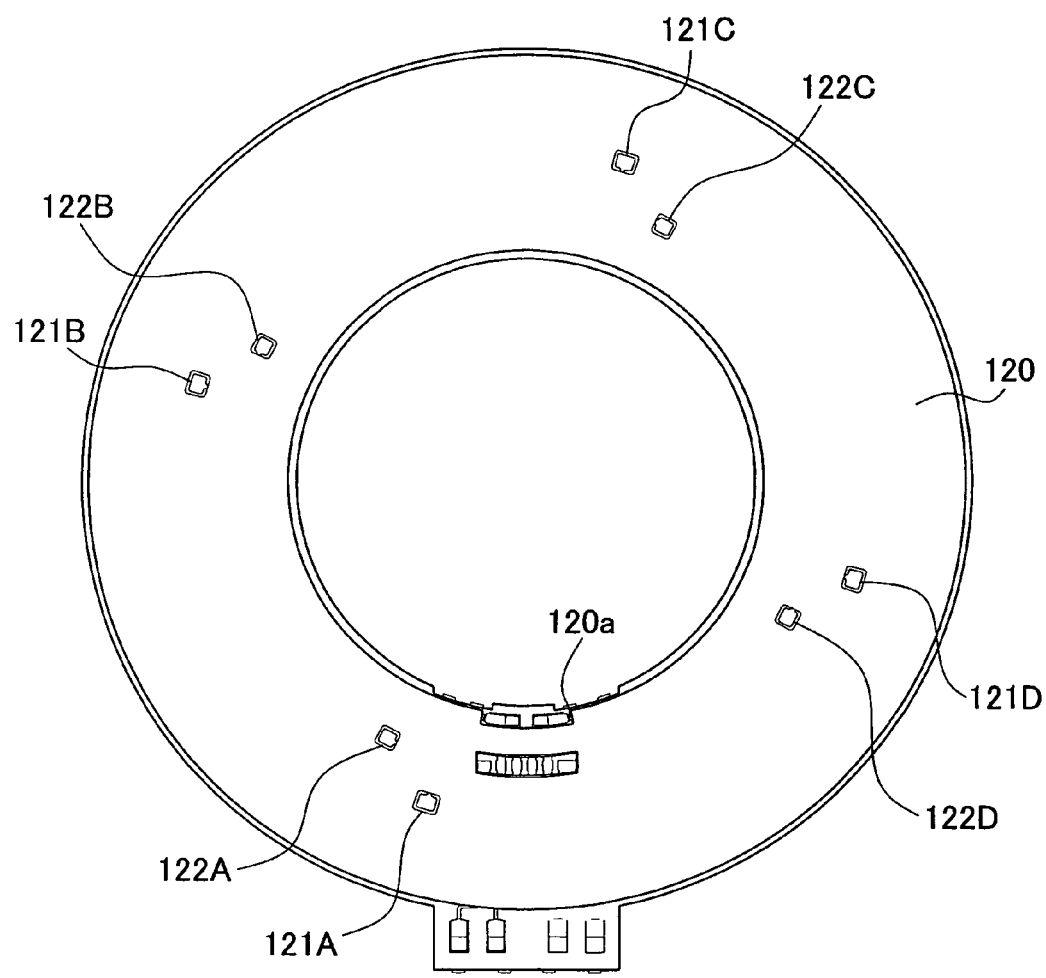
FIG. 23 is a plan view showing a second insulating coat coated on the jumper wires in the eighth embodiment.

FIG. 23 is a plan view showing the second insulating coat 120 coated on the jumper wires 128A to 128D and 129A to 129D. FIG. 24 is a plan view showing a state where the COS signal exciting coil 92 is applied, on the second insulating coat 120 by the ink jet printer. The COS signal exciting coil 92 includes four COS signal exciting coils 92A, 92B, 92C, and 92D placed in positions deviated by 90°. The number of turns of each coil is six. The COS signal exciting coils 92A to 92D are formed with a phase shift of 45° from the SIN signal exciting coils 91A to 91D.

The four COS signal exciting coils 92A to 92D have inner peripheral ends 115A, 115B, 115C, and 115D on the inner periphery side and the outer peripheral ends 116A, 116B, 116C, and 116D on the outer periphery side, respectively. Each of the coils 92A to 92D is wound sequentially from each inner peripheral end 115 (115A to 115D) toward the outer periphery while providing a slight clearance between turns, forming six turns, and ending up with the outer peripheral end 116 (116A to 116D). One end of the COS signal exciting coil 92A is connected to an external terminal 118. One end of the SIN signal exciting coil 92D is connected to an external terminal 117.

As shown in FIG. 23, the second insulating coat 120 is formed with through holes 121A, 121B, 121C, and 121D in positions corresponding to the inner peripheral ends 115A tot 115D of the COS signal exciting coils 92A to 92D respectively. The insulating coat 120 is also formed with through holes 122A, 122B, 122C, and 122D in positions corresponding to the outer peripheral ends 116A to 116D respectively. Furthermore, the second insulating coat 120 is also formed with a cutout portion 120a in a position corresponding to the external terminal 106 and the external terminal 126.

A connecting method using the jumper wires 128A to 128D is explained below. As shown in FIG. 20, the external terminal 108 is connected to one end of the SIN signal exciting coil 91B which is wound counterclockwise with seven turns and connected to the inner peripheral end 104B. The inner peripheral end 104B is connected to one end of the jumper wire 128B through the through hole 111B. The other end of the jumper wire 128B is connected to the outer peripheral end 105B through the through hole 112B.

As shown in FIG. 20, the outer peripheral end 105B is connected to the outer peripheral end 105C of the SIN signal exciting coil 91C. The outer peripheral end 105C is connected to one end of the jumper wire 128C through the through hole 112C. The other end of the jumper wire 128C is connected to the inner peripheral end 104C through the through hole 111C. The inner peripheral end 104C of the SIN signal exciting coil 91C wound clockwise with seven turns is connected to one end of the SIN signal exciting coil 91D and further connected to the inner peripheral end 104D of the coil 91D wound counterclockwise with seven turns.

The inner peripheral end 104D is connected to one end of the jumper wire 128D through the through hole 111D. The other end of the jumper wire 128D is connected to the outer peripheral end 105D through the through hole 112D.

The outer peripheral end 105D is connected to the outer peripheral end 105A of the SIN signal exciting coil 91A. The outer peripheral end 105A is connected to one end of the jumper wire 128A through the through hole 112A. The other end of the jumper wire 128A is connected to the inner peripheral end 104A through the through hole 111A. The inner peripheral end 104A of the SIN signal exciting coil 91A wound clockwise with seven turns is connected to the external terminal 109.

A connecting method using the jumper wires 129A to 129D is explained below. As shown in FIG. 24, the external terminal 118 is connected to one end of the COS signal exciting coil 92A which is wound counterclockwise with seven turns and connected to the inner peripheral end 115A. The inner peripheral end 115A is connected to one end of the jumper wire 129A through the through hole 121A and the other end of the jumper wire 129A is connected to the outer peripheral end 116A through the through hole 122A as shown in FIGS. 22 and 23.

As shown in FIG. 24, the outer peripheral end 116A is connected to the outer peripheral end 116B of the COS signal exciting coil 92B. The outer peripheral end 116B is connected to one end of the jumper wire 129B through the through hole 122B. The other end of the jumper wire 129B is connected to the inner peripheral end 115B through the through hole 121B. The inner peripheral end 115B of the COS signal exciting coil 92B wound clockwise with seven turns is connected to one end of the COS signal exciting coil 92C and further connected to the inner peripheral end 115C of the coil 92C wound counterclockwise with seven turns.

The inner peripheral end 115C is connected to one end of the jumper wire 129C through the through hole 121C. The other end of the jumper wire 129C is connected to the outer peripheral end 116C through the through hole 122C.

The outer peripheral end 116C is connected to the outer peripheral end 116D of the COS signal exciting coil 92D. The outer peripheral end 116D is connected to one end of the jumper wire 129D through the through hole 122D. The other end of the jumper wire 129D is connected to the inner peripheral end 115D through the through hole 121D. The inner peripheral end 115D is connected to the external terminal 117 through the seven-turn coil (92D) wound clockwise and a wire going around the outer periphery of the COS signal exciting coil 92A.

A connecting method of the rotary transformer 95 is explained below. As shown in FIG. 20, the circumferentially formed rotary transformer 95A has the external terminal 106 at one end, and the other end 107 is connected to one end of the rotary transformer 95B of FIG. 22 through the through hole 113. The other end of the rotary transformer 95B is connected to the external terminal 126.

Figure 25:
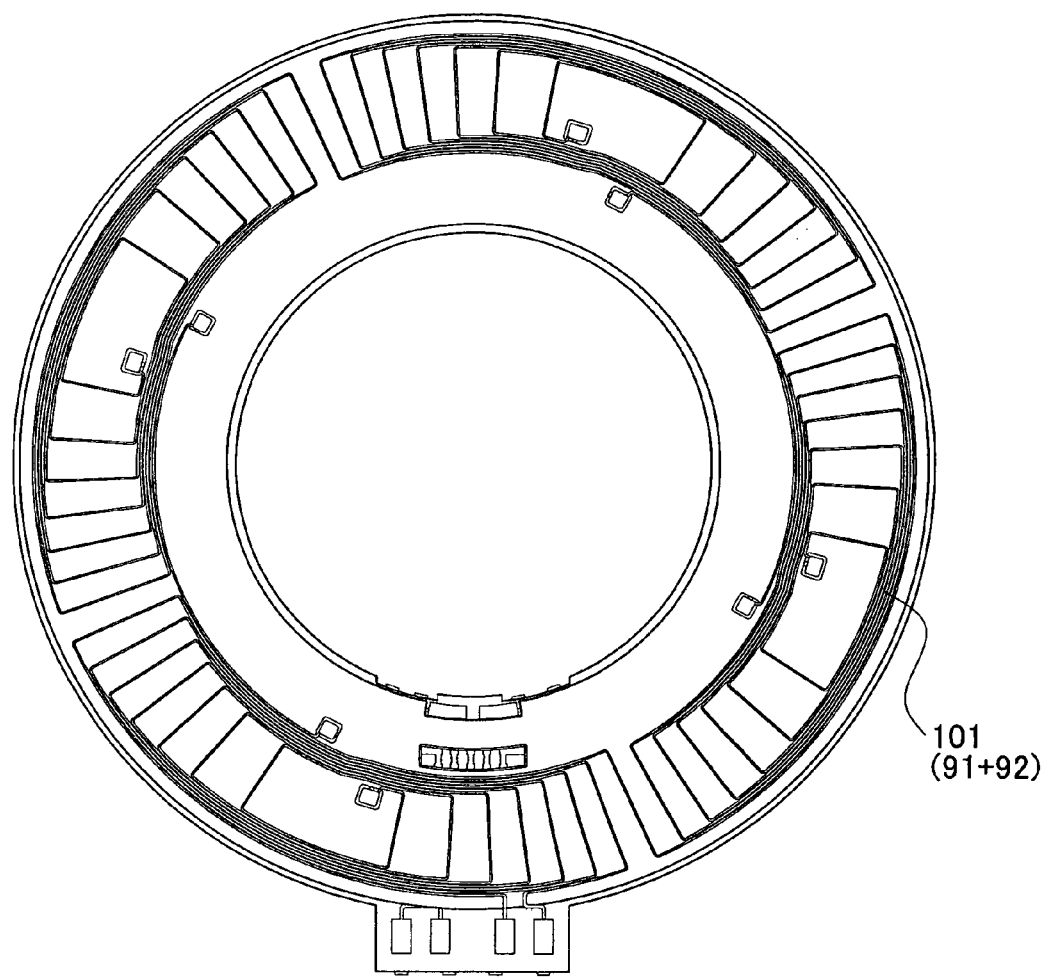
FIG. 25 is a plan view showing a state where a conductive adhesion is applied on a terminal portion of the COS signal exciting coil in the eighth embodiment.
Figure 26A:
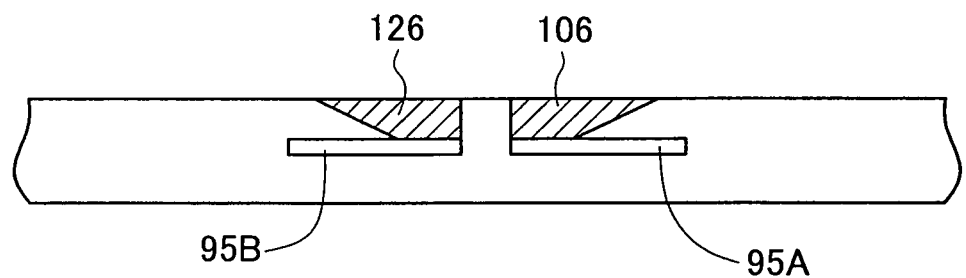
FIG. 26A is a cross sectional view of a section A in FIG. 17 in the eighth embodiment.
Figure 26B:
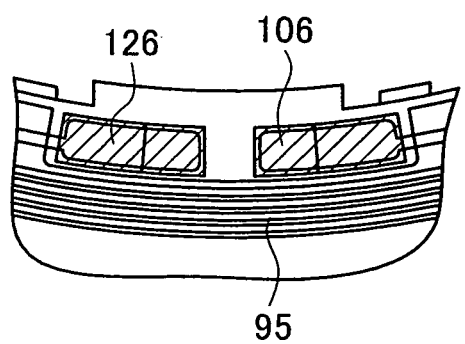
FIG. 26B is an enlarged view of the section A in FIG. 17 in the eighth embodiment.
Figure 28:
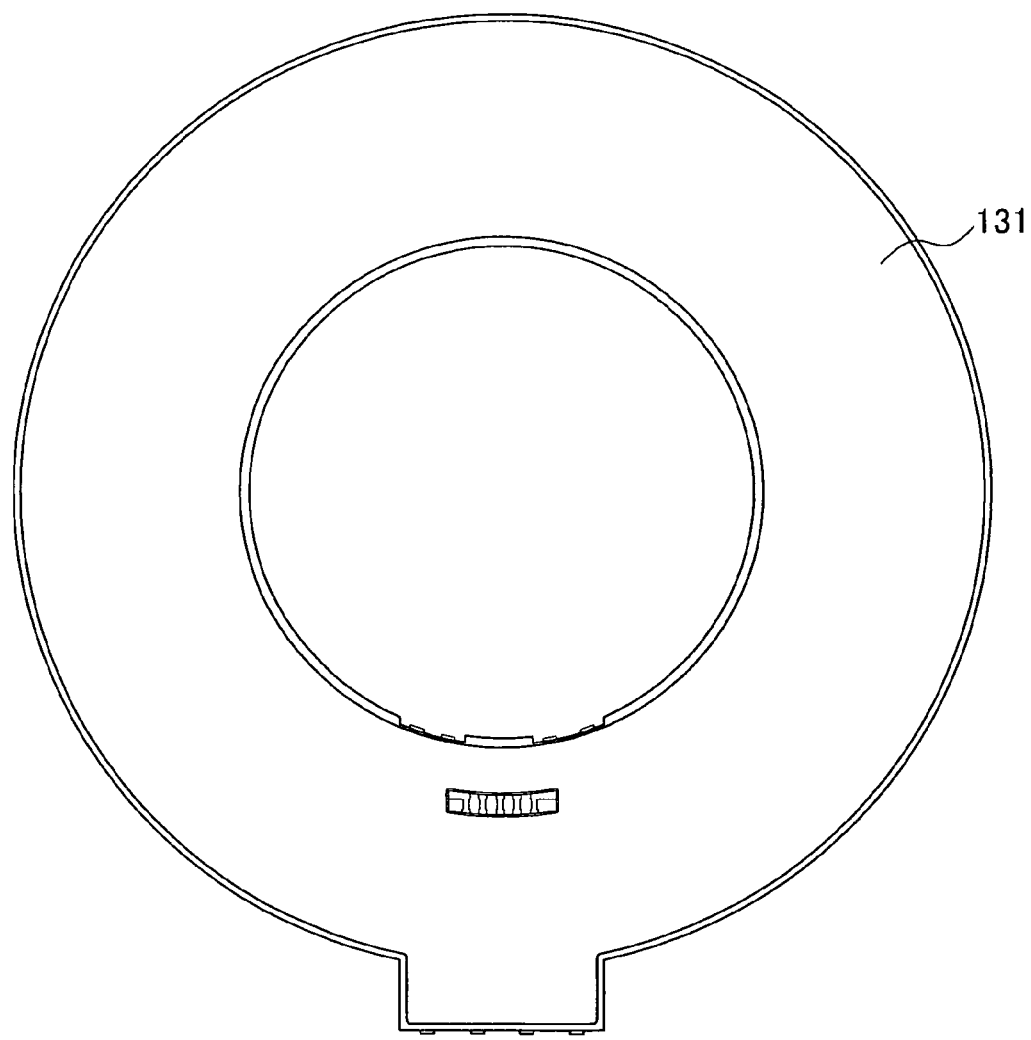
FIG. 28 is a plan view showing a state where a protective film is formed on the COS signal exciting coil in the eighth embodiment.

As shown in FIG. 25, a conductive adhesive is applied to the terminal portion of the COS signal exciting coil 92 to form an external terminal, which is connected to an external wire. FIGS. 26A, 26B, 27A, and 27B show a state where the external terminals 106, 126, 108, 109, 117, and 118 are formed by application of the conductive adhesive. FIGS. 26A and 26B show a connecting configuration of the external terminal 106 and the rotary transformer 95A and a connecting configuration of the transformer end 126 and the rotary transformer 95B. Specifically, FIG. 26B is an enlarged view of a section A in FIG. 17 and FIG. 26A is a cross sectional view of FIG. 26B. FIGS. 27A and 27B show a connection configuration of the external terminal 117. Specifically, FIG. 27A is an enlarged view of a section B in FIG. 17 and FIG. 27B is a cross sectional view of FIG. 27A. FIG. 28 is a plan view showing a state where a protective film 131 is formed to coat over the entire COS signal exciting coils including the protrusion 102a.

Figure 29:
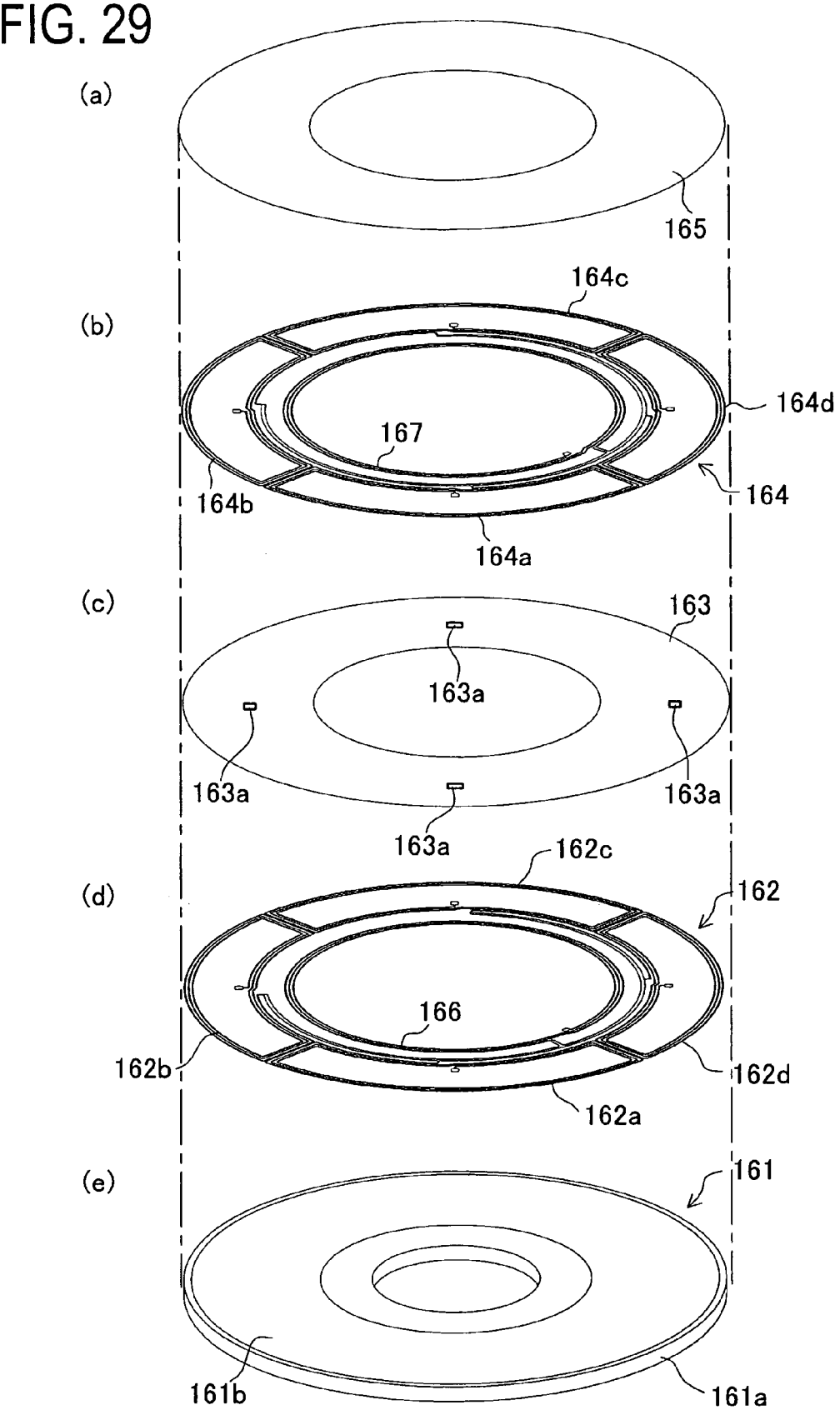
FIG. 29 is an exploded perspective view showing the resolver rotor structure in the eighth embodiment.

The resolver rotor 75 formed with the detection coil 93 is explained below. FIG. 29 is an exploded perspective view showing the structure of the resolver rotor 75. In FIG. 29, a view (e) shows a base plate 161 of the rotor 75, a view (d) shows a first coil layer 162 formed on the surface of the base plate 161, a view (c) shows an interlayer insulating layer 163 for insulation between the first coil layer 162 and a second coil layer 164, a view (b) shows the second coil layer 164 formed on the interlayer insulating layer 163, and a view (a) shows an overcoat 165 made of insulating resin and serving as a protective layer.

The base plate 161 is of a disc shape centrally formed with a circular hole as shown in the view (e) of FIG. 29. The base plate 161 includes a plate 161a which is made of non-magnetic conductive metal such as aluminum and brass and formed with a recess on the surface in which resin 161b such as PPS is filled and solidified.

The first coil layer 162 includes four detecting coils 162a, 162b, 162c, and 162d. The second coil layer 164 also includes four detecting coils 164a, 164b, 164c, and 164d. One ends of the detecting coils 162a to 162d are connected to one end of the rotary transformer 166. The other ends of the detecting coils 162a to 162d are connected to one ends of the four detecting coils 164a to 164d of the second coil layer 164 respectively through corresponding through holes 163a. The other ends of the detecting coils 164a to 164d are connected to one end of the rotary transformer 167. The other end of the rotary transformer 166 and the other end of the rotary transformer 167 are connected to each other through a through hole.

Accordingly, when the detecting coils 161 and 164 receive a magnetic flux generated in the exciting coil, the detecting coils 162 and 164 generate an induced current, and the current flows to the rotary transformers 166 and 167. A magnetic flux generated by this induced current causes an induced current to occur in the rotary transformer 95 on the resolver body side. By analyzing this induced current, the rotation position of the resolver rotor can be calculated. In the present embodiment, the rotary transformer 166 is formed in the first coil layer 162 and the rotary transformer 167 is formed in the second coil layer 164. Accordingly, an occupied area of each rotary transformer in one coil layer can be reduced, thus achieving a reduction in outer dimension of the resolver.

Figure 30:
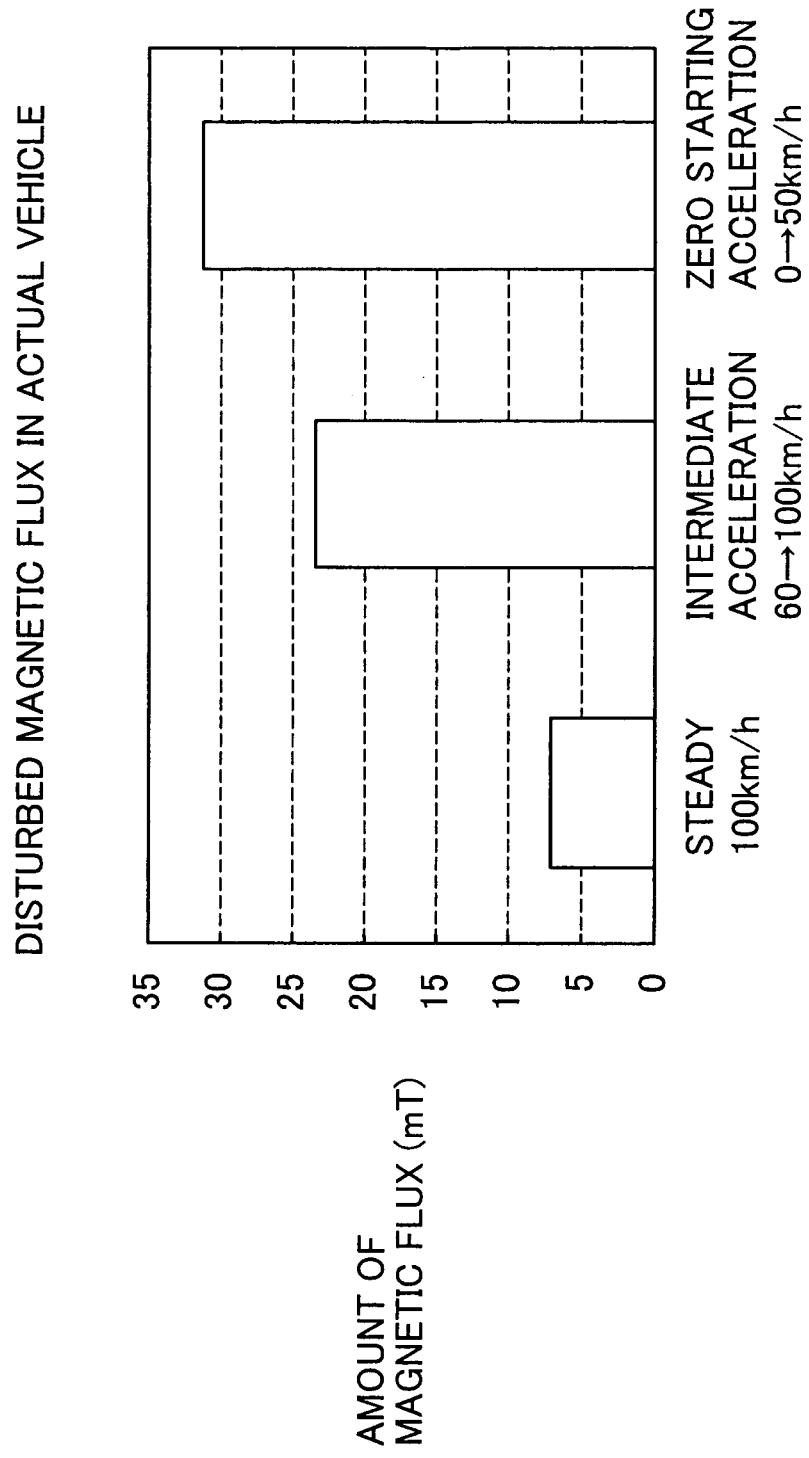
FIG. 30 is a graph showing difference in disturbed magnetic flux amount in an actual vehicle in the eighth embodiment.

The effects of the resolver structure in this embodiment is explained below. FIG. 30 is a graph showing intensity of a magnetic flux generated from a motor stator in a hybrid electric vehicle, namely, intensity of a disturbed magnetic flux to the resolver. In the graph, a vertical axis indicates the amount of magnetic flux (unit: mT) and a lateral axis indicates the condition. In a steady condition (100 km/h), the magnetic flux amount is about 7 mT. In an intermediate acceleration condition for acceleration from 60 km/h to 100 km/h, the magnetic flux amount is about 24 mT. In a zero starting acceleration condition for acceleration from 0 km/h to 50 km/h, the magnetic flux amount is about 32 mT.

Figure 31:
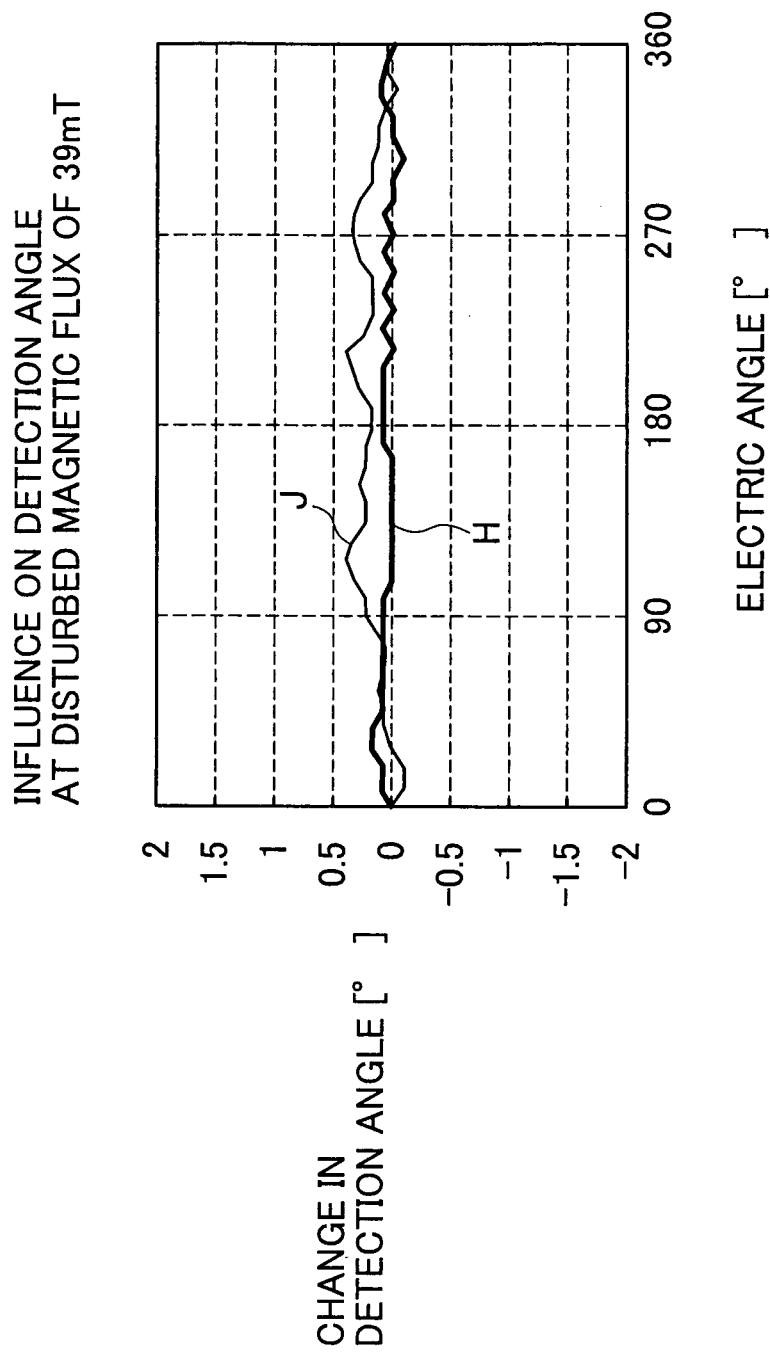
FIG. 31 is a graph showing influence of disturbed magnetic flux on a detection angle in the eighth embodiment.

FIG. 31 is a graph showing the change amount in detection angle of the resolver in the case where a magnetic flux amount of 39 mT is given as a disturbed magnetic flux. In the graph, a vertical axis indicates the change in detection angle and a lateral axis indicates the electric angle, and a line "H" represents data of the resolver of the present embodiment and "J" represents data of the conventional resolver. In the conventional resolver structure, the detection angle change (error) occurs at all electric angles. As compared thereto, in the resolver structure in the present embodiment, no detection angle change (error) occurs at almost all electric angles.

Figure 32:
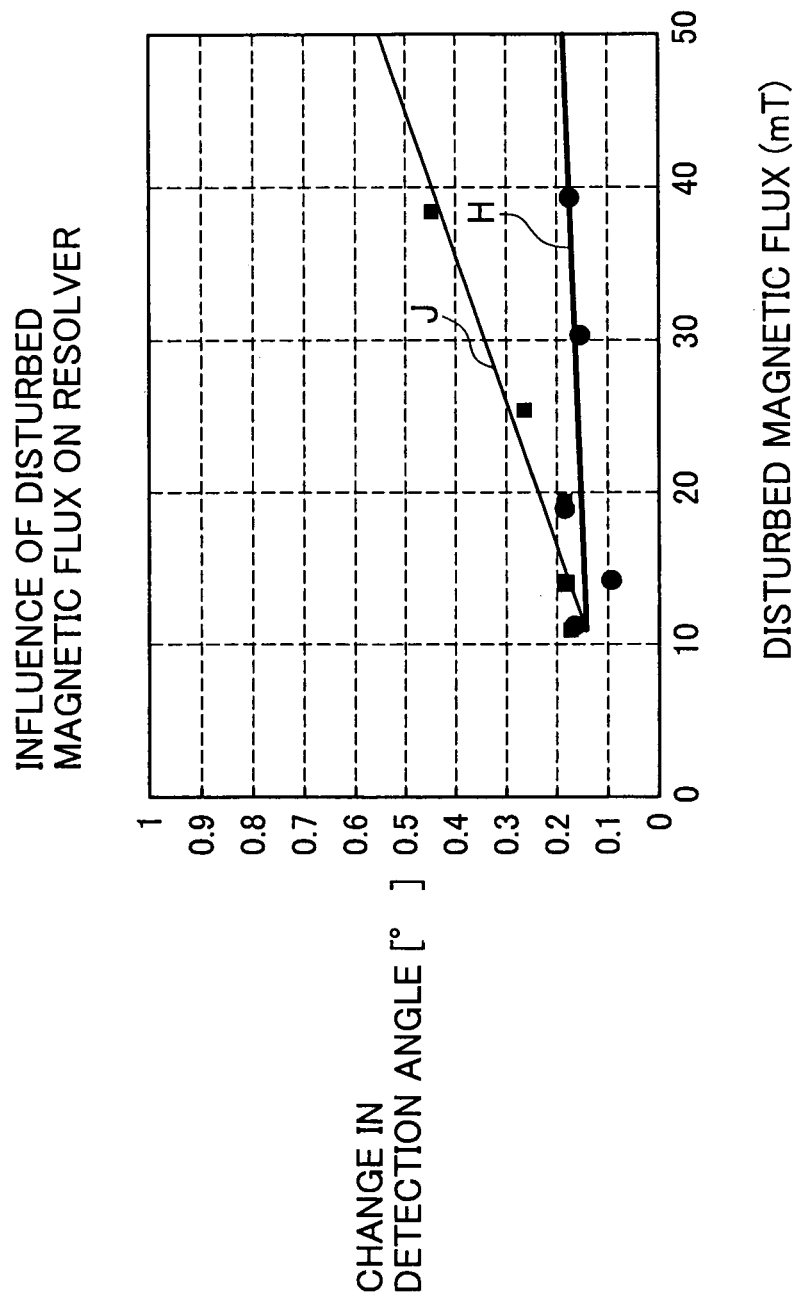
FIG. 32 is a graph showing influence of disturbed magnetic flux on the resolver in the eighth embodiment.
Figure 33:
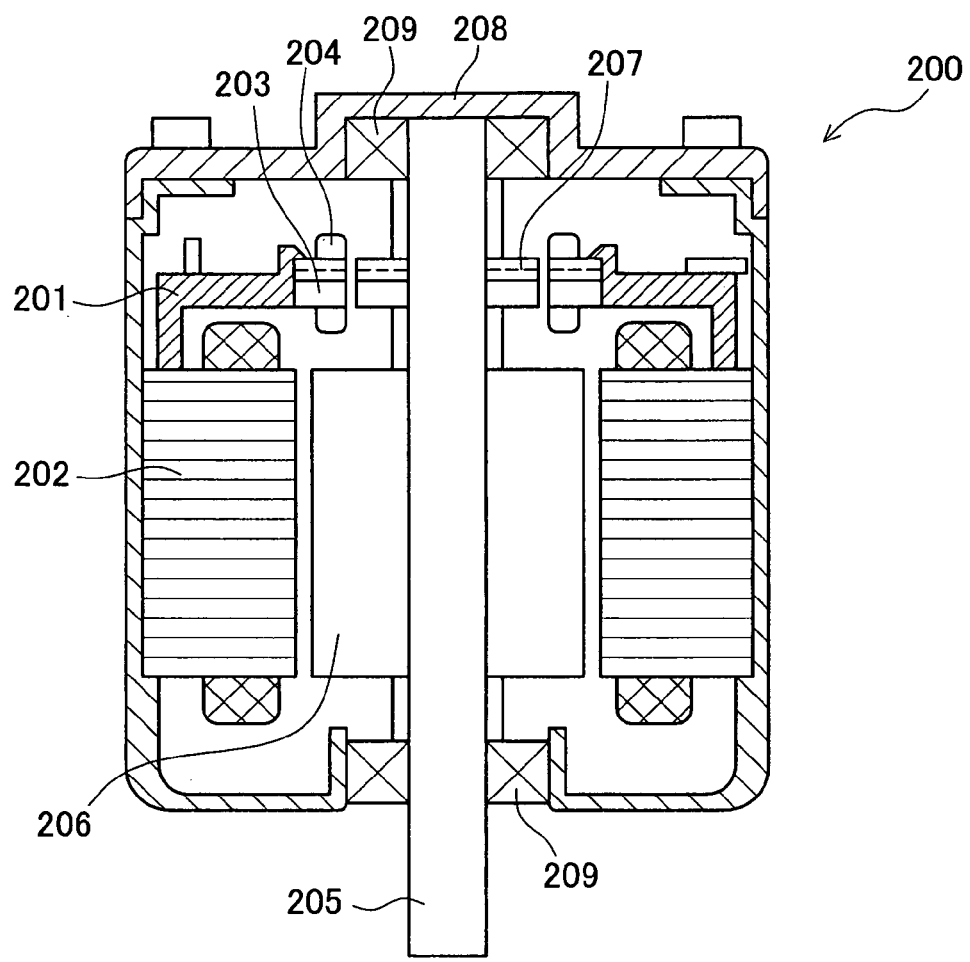
FIG. 33 is a cross sectional view showing a motor structure internally having a conventional resolver.

FIG. 32 is a graph showing the influence on the resolver when the disturbed magnetic flux is changed. In the graph, a vertical axis indicates the change (error) in detection angle and a lateral axis indicates the disturbed magnetic flux (mT), and "H" represents data of the resolver in the present embodiment and "J" represents data of the conventional resolver. In the conventional resolver, when the disturbed magnetic flux is increased, the detection angle change (error) also increases proportionately. In the resolver in the present embodiment, the detection angle change (error) hardly increases even if the disturbed magnetic flux is increased.

The operations of the resolver having the above configuration are explained below. The SIN signal exciting coil 91 of the resolver stator 77 is excited by the sine wave (A sin ωt) which is the first exciting signal S1 whose amplitude has been modulated by a carrier wave of 500 kHz. The COS signal exciting coil 92 is excited by the cosine wave which is the second exciting signal whose amplitude has been modulated by a carrier wave of 500 kHz. Thus, in the resolver rotor pattern 94, AB sin (ωt+θ) which is an output signal is generated as an induced current. The output signal is input to the phase difference detector 87 via the rotary transformer patterns 94 and 95 and the wave detector 86 provided on the stator side. On the other hand, the sine wave (A sin ωt) which is the first exciting signal is input from the drive circuit 81 to the phase difference detector 87. Based on a time lag of detection of a zero cross in the phase difference detector 87, the phase difference detector 87 calculates the rotation angle of the motor rotor 73.

As explained above in detail, in the resolver structure in the present embodiment, the motor stator 72 and the bearings 76a and 76b are fixed to the case cover 71 and the case body 79, the motor shaft 74 rotatably supported by the bearings 76a and 76b includes the motor rotor 73, the resolver stator 77 of the resolver for detecting the rotation angle of the motor rotor 73 is attached to the case cover 71, and the resolver rotor 75 is attached to the motor rotor 73. In such structure of the motor with resolver, the resolver rotor 75 is constituted of an air core coil and provided on the end face of the motor rotor 73, and the resolver stator 77 is constituted of an air core coil. Accordingly, since a back core is not provided, the disturbed magnetic flux generated from the motor stator 72 does not exert an influence on the resolver stator 77 through the back core, reducing the noise the resolver stator 77 receives from the motor stator 72, thus avoiding deterioration of angle detection accuracy of the resolver. Herein, the reason why the back core is not provided is in that the coils are excited with a high frequency of 500 kHz and hence even a small signal can be detected sufficiently.

In the present embodiment, the resolver has no iron core and hence does not cause magnetic saturation of an iron core even when the resolver receives the disturbed magnetic field having a high magnetic flux density. Accordingly, the resolver can always function normally. Using the high frequency enables a reduction in the number of turns of the resolver stator 77 to several turns (seven turns in the present embodiment). Thus, the resolver is less affected by a noise of 100 kHz or less. In the present embodiment, the SIN signal exciting coil 91 and the COS signal exciting coil 92 are each wound with seven turns but they may be wound with four to seven turns according to the number of motor rotations and the number of magnetic poles.

Furthermore, the resolver in the present embodiment is less affected by the noise from the motor. Thus, the resolver stator 77 and the resolver rotor 75 each being in a thin film shape can be placed to face each other in the axial direction of the rotating shaft. This can achieve a reduced length of the resolver occupying in the axial direction of the rotating shaft and a compact motor.

In the present embodiment, the shield plate 78 formed of a non-magnetic conductive flat plate is placed between the resolver rotor 75 and the end face of the motor rotor 73. Accordingly, the magnetic flux generated in the motor stator 72 generates an eddy current on the surface of the base plate 102 or the shield plate 78, and the current changes into heat. This makes it possible to reduce the magnetic flux that can reach the resolver stator 77, thereby reducing noise the resolver stator 77 receives from the motor stator 72. Thus, the angle detection accuracy of the resolver is not deteriorated.

In the present embodiment, the air core coil is formed by a conductive ink. Accordingly, a thin film pattern is accurately made with a thickness of 10 μm or less. Since the thin film pattern can be formed with a correct width, the accuracy of the resolver can be enhanced.

In the present embodiment, furthermore, the thin film pattern is fixed to the resolver rotor in such a way that the ink solution comprising silver particles dispersed in a dispersant is applied by the ink jet printer and then burnt. The thin film pattern can be reliably fixed to the resolver rotor.

The air core coil is configured such that the SIN signal exciting coil 91, the insulating coat 110 serving as the first insulating layer, the layer formed with the jumper wires 128 and 129, the insulating coat 120 serving as the second insulating layer, and the COS signal exciting coil 92, each of which is formed with the through hole, are laminated. The conductive ink on a layer located on top of each layer is connected to the conductive ink on a layer located on bottom of each layer through holes 111, 112, 121, and 122. Accordingly, by just simply forming even each layer and each air core coil by the ink jet printer, the resolver stator 77 can be efficiently manufactured. A manufacturing cost can therefore be reduced.

In the present embodiment, the exciting signal for the resolver stator is a signal of 300 kHz or higher and 500 kHz or lower or a signal of 1.8 MHz or higher and 2.7 MHz or lower. In the hybrid electric vehicle, therefore, radio noise is less given to AM radio and FM radio. Since radios are used in a range of 500 kHz or higher, the exciting signal of 500 kHz or lower hardly gives noise to the radios. The resolver of the present embodiment has a sufficiently large S/N ratio for 500 kHz. An S/N ratio for 300 kHz is as small as about a half of the S/N for 500 kHz but it is in a practicable range.

In the present embodiment, the exciting signal of 300 kHz or higher is used and therefore a bypass filter can easily cut motor noise of about 10 kHz at a maximum. Thus, the angle detection accuracy of the resolver can be enhanced. Since the number of turns of a coil is reduced so that the resolver is used by excitation at high frequency, the coil is unlikely to be influenced by a noise signal of 100 kHz or lower.

The present invention is not limited to the aforementioned embodiments and may be embodied in other specific forms without departing from the essential characteristics thereof.

For instance, in each of the above embodiments, the shield member is the shield plate 18 made of copper but may be a shield plate made of brass. As another alternative, a thick shield plate made of copper plating or aluminum may be used.

In the first embodiment, the resolver rotor pattern 30 and the rotary transformer pattern 31, the resolver stator first pattern 51, the rotary transformer pattern 57 and the resolver stator second pattern 52 are formed in the thin film patterns by the ink jet printer (an ink jet method). As alternatives, the thin film patterns may be formed by an evaporation method, a spattering method, a plating method, or an etching method.

In the fourth embodiment, the lid casing 20 and the cylindrical portion 20*b* are made of non-magnetic conductive material such as aluminum. As an alternative, these lid casing 20 and cylindrical portion 20*b* may be made of a magnetic body such as iron.

In the fifth and seventh embodiments, the shield plate 18 and the cylindrical portion 18*a* are made of a non-magnetic conductive material such as aluminum. As an alternative, these shield plate 18 and the cylindrical portion 18*a* may be made of a magnetic body such as iron.

In the sixth embodiment, the shield member 27 is made of a non-magnetic conductive material such as aluminum but it may be made of a magnetic body such as iron.

INDUSTRIAL APPLICABILITY

The present invention is available for a motor of for example a hybrid electric vehicle, an electric vehicle, etc.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

11 Motor casing
12 Motor stator
13 Motor shaft
15 Motor rotor
18 Shield plate
18*a* Cylindrical portion
19 Resolver rotor
20 Lid casing
20*a* Protrusion
20*b* Cylindrical portion
21 Bearing
23 Resolver stator
27 Shield member
30 Resolver rotor pattern
31 Rotary transformer pattern
51 Resolver stator first pattern
52 Resolver stator second pattern
57 Rotary transformer pattern
71 Case cover
72 Motor stator
73 Motor rotor
74 Motor shaft
75 Resolver rotor
76 Bearing
77 Resolver stator
78 Shield plate
91 SIN signal exciting coil
92 COS signal exciting coil
110 Insulating coat
111 Through hole
112 Through hole
120 Insulating coat
121 Through hole
122 Through hole
128 Jumper wire
129 Jumper wire
162 First coil layer
164 Second coil layer

The invention claimed is:

1. A motor structure with rotation detector comprising:
 a motor casing;
 a motor stator provided in the motor casing;
 a bearing provided in the motor casing;
 a rotating shaft rotatably supported in the motor casing by the bearing;
 a motor rotor provided to be integrally rotatable with the rotating shaft and including a permanent magnet; and
 a rotation detector for detecting a rotation angle of the motor rotor,
 wherein the rotation detector includes:
  a disc-shaped resolver stator held in the motor casing and having a surface on which a thin-film-shaped coil is formed; and
  a disc-shaped resolver rotor provided on an end face of the motor rotor and having a surface on which a thin-film-shaped coil is formed,
 wherein a shield member is provided between the motor rotor and the resolver rotor, the shield member is formed of a non-magnetic conductive material, and the shield member is in contact with an end face of the motor rotor to cover an end face of the permanent magnet.

2. The motor structure with rotation detector according to claim 1, wherein the thin-film-shaped coil formed on the resolver rotor is formed in a thin film pattern on the surface of the resolver rotor by an inkjet printer.

3. The motor structure with rotation detector according to claim 2, wherein the thin film pattern is fixed to the resolver rotor in such a way that an ink solution comprising silver particles dispersed in a dispersant is applied on the resolver rotor by the ink jet printer and then burnt.

4. The motor structure with rotation detector according to claim 1, wherein the shield member is a copper plate or copper plating.

5. The motor structure with rotation detector according to claim 1, wherein the resolver stator and the bearing are positioned with respect to the motor casing.

6. The motor structure with rotation detector according to claim 1, wherein the motor casing holding the outer periphery of the resolver stator includes a shield portion cylindrically protruding along the outer periphery of the resolver rotor to reach the resolver rotor.

7. The motor structure with rotation detector according to claim 6, wherein the motor casing is formed of a non-magnetic conductive material.

8. The motor structure with rotation detector according to claim 6, wherein the motor casing is formed of a magnetic body.

9. The motor structure with rotation detector according to claim 1, wherein a cylindrical shield member is provided from a part of the motor casing holding the outer periphery of the resolver stator to the resolver rotor.

10. The motor structure with rotation detector according to claim 1, wherein an outer peripheral edge of the shield member provided between the motor rotor and the resolver rotor is formed to cylindrically protrude along the outer periphery of the resolver rotor to reach the vicinity of the resolver stator.

11. A motor structure with rotation detector comprising:
a motor casing;
a motor stator provided in the motor casing;
a bearing provided in the motor casing;
a rotating shaft rotatably supported in the motor casing by the bearing;
a motor rotor provided to be integrally rotatable with the rotating shaft and including a permanent magnet; and
a rotation detector for detecting a rotation angle of the motor rotor, the rotation detector including a resolver stator attached to the motor casing and a resolver rotor attached to the motor rotor,
wherein the resolver rotor includes a first planar coil, the resolver rotor is provided on an end face of the motor rotor, and the resolver stator includes a second planar coil, and
wherein a non-magnetic flat plate is provided between the resolver rotor and an end face of the motor rotor, and the non-magnetic flat plate is in contact with the end face of the motor rotor to cover an end face of the permanent magnet.

12. The motor structure with rotation detector according to claim 11, wherein the first planar coil and the second planar coil are made of a conductive ink.

13. The motor structure with rotation detector according to claim 11, wherein an exciting signal of the resolver stator is a signal of 300 kHz or higher and 500 kHz or lower or a signal of 1.8 MHz or higher and 2.7 MHz or lower.

14. The motor structure with rotation detector according to claim 11, wherein the first planar coil and the second planar coil are air core coils.

* * * * *